US012209548B2

(12) United States Patent
Roelle et al.

(10) Patent No.: US 12,209,548 B2
(45) Date of Patent: Jan. 28, 2025

(54) CONTROL OF PISTON TRAJECTORY IN A LINEAR GENERATOR

(71) Applicant: Mainspring Energy, Inc., Menlo Park, CA (US)

(72) Inventors: Matthew Roelle, Belmont, CA (US); Christopher Gadda, Palo Alto, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

(21) Appl. No.: 18/218,401

(22) Filed: Jul. 5, 2023

(65) Prior Publication Data

US 2024/0125281 A1 Apr. 18, 2024

Related U.S. Application Data

(60) Continuation of application No. 17/725,787, filed on Apr. 21, 2022, now Pat. No. 11,739,705, which is a
(Continued)

(51) Int. Cl.
*F02M 7/00* (2006.01)
*F01B 11/00* (2006.01)
(Continued)

(52) U.S. Cl.
CPC .......... *F02D 41/1497* (2013.01); *F01B 11/00* (2013.01); *F02B 63/04* (2013.01);
(Continued)

(58) Field of Classification Search
CPC ..... F02B 63/041; F02B 71/00; H02K 7/1884; F02D 29/06; H02P 6/006; H02P 9/08
(Continued)

(56) References Cited

U.S. PATENT DOCUMENTS 3,297,007 A 1/1967 Monpetit
7,721,686 B2 5/2010 Lindgarde
(Continued)

FOREIGN PATENT DOCUMENTS

DE 10241101 A1 3/2004
DE 102008030633 A1 12/2009
(Continued)

OTHER PUBLICATIONS

Hanipah et al., "Recent commercial free-piston engine developments for automotive applications", Applied Thermal Engineering, vol. 75, Oct. 5, 2014, pp. 493-503.
(Continued)

*Primary Examiner* — Long T Tran
*Assistant Examiner* — James J Kim
(74) *Attorney, Agent, or Firm* — HALEY GUILIANO LLP

(57) ABSTRACT

Various embodiments of the present disclosure are directed towards free-piston combustion engines. As described herein, a method and system are provided for displacing a free-piston assembly to achieve a desired engine performance by repeatedly determining position-force trajectories over the course of a propagation path and effecting the displacement of the free-piston assembly based, at least in part, on the position-force trajectory. In a dual-piston assembly free-piston engine, synchronization of the two piston assemblies is provided.

20 Claims, 13 Drawing Sheets

Related U.S. Application Data continuation of application No. 17/350,224, filed on Jun. 17, 2021, now Pat. No. 11,339,735, which is a division of application No. 16/910,673, filed on Jun. 24, 2020, now Pat. No. 11,053,876, which is a continuation of application No. 16/553,052, filed on Aug. 27, 2019, now Pat. No. 10,731,586, which is a continuation of application No. 16/175,358, filed on Oct. 30, 2018, now Pat. No. 10,408,150, which is a continuation of application No. 15/489,657, filed on Apr. 17, 2017, now Pat. No. 10,156,198, which is a continuation of application No. 15/087,990, filed on Mar. 31, 2016, now Pat. No. 9,657,675.

(51) Int. Cl.

| | |
|---|---|
| ***F02B 63/04*** | (2006.01) |
| ***F02B 71/00*** | (2006.01) |
| ***F02B 71/04*** | (2006.01) |
| ***F02D 29/06*** | (2006.01) |
| ***F02D 35/02*** | (2006.01) |
| ***F02D 41/00*** | (2006.01) |
| ***F02D 41/14*** | (2006.01) |

(52) U.S. Cl.

CPC .............. *F02B 71/00* (2013.01); *F02B 71/04* (2013.01); *F02D 29/06* (2013.01); *F02D 35/023* (2013.01); *F02D 35/024* (2013.01); *F02D 41/009* (2013.01); *F02D 41/1402* (2013.01)

(58) Field of Classification Search

USPC .......................................................... 123/435

See application file for complete search history.

(56) References Cited

U.S. PATENT DOCUMENTS

| | | | | |
|---|---|---|---|---|
| 8,127,544 | B2 | 3/2012 | Schwiesow et al. | |
| 8,413,617 | B2 * | 4/2013 | Simpson | F02B 75/282 123/46 E |
| 10,202,897 | B2 * | 2/2019 | Sun | F02D 35/023 |
| 2006/0124083 | A1 | 6/2006 | Niiyama et al. | |
| 2012/0024264 | A1 | 2/2012 | Mikalsen et al. | |
| 2013/0082000 | A1 * | 4/2013 | d'Artenay | C02F 1/441 210/651 |
| 2016/0160754 | A1 * | 6/2016 | Moriya | F02B 71/06 290/40 C |
| 2016/0208686 | A1 * | 7/2016 | Gadda | F02B 63/041 |

FOREIGN PATENT DOCUMENTS

| | | | |
|---|---|---|---|
| JP | 2005-074308 | A | 3/2005 |
| JP | 2007-532827 | A | 11/2007 |
| JP | 2012-031746 | A | 2/2012 |
| JP | 2012-202386 | A | 10/2012 |
| JP | 2012-202387 | A | 10/2012 |
| WO | 2005/100764 | A1 | 10/2005 |
| WO | 2014/172382 | A1 | 10/2014 |

OTHER PUBLICATIONS

Johansen et al., "Free-Piston Diesel Engine Timing and Control-Towards Electronic Cam- and Crankshaft", IEEE Transactions On Control Systems Technology, vol. 9, No. 3, Mar. 1, 2002, pp. 1-14.

Zaseck et al., "Adaptive control approach for cylinder balancing in a hydraulic linear engine", 2013 American Control Conference, Jun. 17, 2013, pp. 2171-2176.

* cited by examiner

CONTROL OF PISTON TRAJECTORY IN A LINEAR GENERATOR

CROSS-REFERENCE TO RELATED APPLICATIONS

The present disclosure relates to free-piston combustion engines and, more particularly, the present disclosure relates to control of piston trajectory in a free-piston combustion engine. This application is a continuation of U.S. patent application Ser. No. 17/725,787, filed Apr. 21, 2022, which is a continuation of U.S. patent application Ser. No. 17/350,224 filed Jun. 17, 2021, now U.S. Pat. No. 11,339,735, which is a divisional of U.S. patent application Ser. No. 16/910,673 filed Jun. 24, 2020, now U.S. Pat. No. 11,053,876, which is a continuation of U.S. patent application Ser. No. 16/553,052 filed Aug. 27, 2019, now U.S. Pat. No. 10,731,586, which is a continuation of U.S. patent application Ser. No. 16/175,358 filed Oct. 30, 2018, now U.S. Pat. No. 10,408,150, which is a continuation of U.S. patent application Ser. No. 15/489,657 filed Apr. 17, 2017, now U.S. Pat. No. 10,156,198, which is a continuation of U.S. patent application Ser. No. 15/087,990 filed Mar. 31, 2016, now U.S. Pat. No. 9,657,675, the disclosures of which are hereby incorporated by reference herein in their entireties.

BACKGROUND

Some free-piston engines rely on position versus time control of pistons in which a desired position versus time trajectory of a piston is determined based on an initial position of the piston. As the system causes a piston to move, the control strategy measures how much the piston is deviating from the desired position versus time trajectory and attempts to compensate for any deviation in order to bring the piston closer to the desired position versus time trajectory. Some free-piston engines rely on control strategies that measure how much a piston is deviating from other suitable trajectories (e.g., position versus velocity) and attempt to compensate for any deviation in order to bring the piston closer to the desired trajectory.

These approaches typically rely on an open-form solution for controlling a piston's movement based on a previously determined trajectory and often do not take into account changing conditions in the engine, which would affect the movement of the piston. For example, after the desired trajectory is determined, conditions in the engine can change such that the desired trajectory is no longer applicable. Movement of the piston will still, however, be based on the original desired trajectory and deviation therefrom.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

Figure 1:
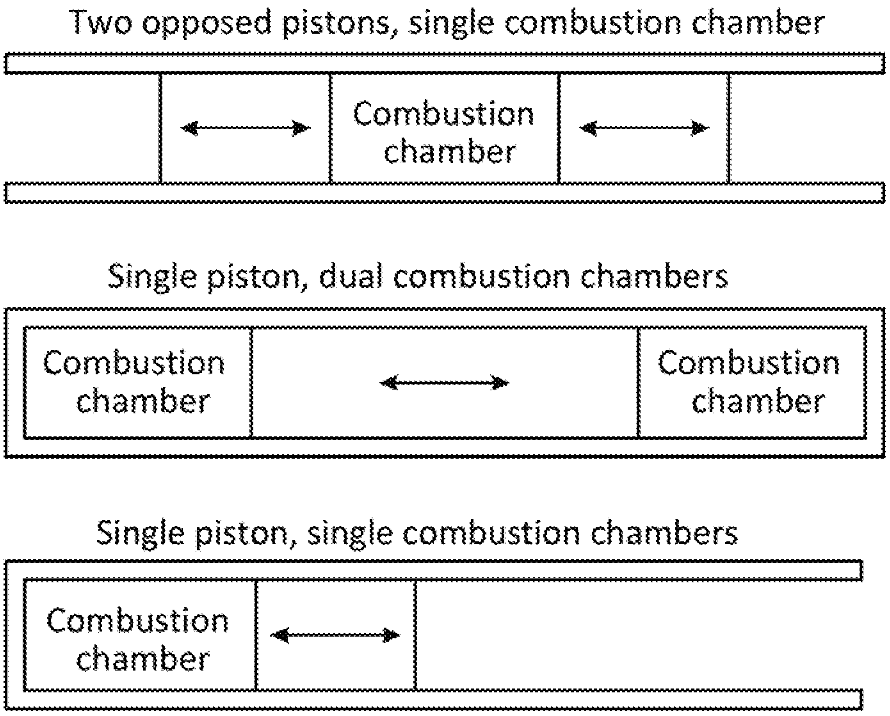
FIG. 1 is a diagram of three illustrative free-piston combustion engine configurations.

The figures are not intended to be exhaustive or to limit the disclosure to the precise form disclosed. It should be understood that the concepts and embodiments disclosed can be practiced with modification and alteration, and that the disclosure is limited only by the claims and the equivalents thereof.

DETAILED DESCRIPTION

Various embodiments of the present disclosure are directed towards controlling a free-piston linear combustion engine. In at least one embodiment, the engine comprises: (i) a cylinder comprising a combustion section, (ii) at least one free-piston assembly in contact with the combustion section, (iii) at least one driver section in contact with the at least one free-piston assembly that stores energy during an expansion stroke of the engine (iv) and at least one linear electromagnetic machine (LEM) that directly converts between kinetic energy of the at least one free-piston assembly and electrical energy. It should be noted, however, that further embodiments may include various combinations of the above-identified features and physical characteristics.

The present disclosure is related to a control technique for determination and implementation of a trajectory for one or more of the piston assemblies in a free-piston engine. As used herein, the term "trajectory" refers to a sequence of data pairs that describe the motion of a piston assembly in a free-piston engine, such as, for example, a position-force trajectory (a sequence of position-force pairs), a time-position trajectory (a sequence of time-position pairs), or a position-velocity trajectory (a sequence of position-velocity pairs). A position-force trajectory defines the force acting on a piston assembly at one or more specified positions of the piston assembly, a time-position trajectory defines the position of a piston assembly at one or more specified instances in time, and a position-velocity trajectory defines the velocity of a piston assembly at one or more specified positions of the piston assembly. At least one of the elements in a data pair of a trajectory may be considered the abscissa in a functional relationship with the other data element being ordinate. In the case of multiple free-piston assemblies in one engine (e.g., arranged as opposed-pistons with a shared combustion section), a trajectory may include data pairs for each respective piston assembly. It will be understood that, while a trajectory is generally described as being a sequence of data pairs, a trajectory may, under certain conditions, include only a single data pair (e.g., a single position-force pair in the case of a position-force trajectory).

In accordance with the present disclosure, a processing sub-system of a free-piston engine computes a position-force trajectory for one or more piston assemblies in a free-piston engine based at least on a current position of the one or more piston assemblies and a desired engine performance. As used herein with respect to control of a free-piston engine, the term "desired engine performance" refers to operating the engine such that the one or more piston assemblies apex at desired respective positions, that the one or more piston assemblies reach desired respective target positions with a respective specified velocity or acceleration, that one or more piston assemblies reach desired respective target positions with any other suitable parameter or condition, or any combination thereof. The processing sub-system determines particular force values based on a position-force trajectory that are to be effected on the one or more piston assemblies as a function of their positions along their respective propagation paths between respective apices. It will be understood that, while the present disclosure is described in the context of determining force values that are effected on a piston assembly, any other suitable parameter value can be calculated for effecting the movement of a piston assembly. For example, any suitable gas pressure value can be used to effect movement of a piston assembly, such as, for example, with respect to a gas pressure supplied by an external compressed gas source or effecting a gas pressure by adjusting an aspect of a gas spring. As used herein, the term "propagation path" refers to a positional path along which a piston assembly traverses. For example, a processing sub-system may first calculate a position-force trajectory for the one or more piston assemblies based at least on a current position of the one or more piston assemblies and a desired engine performance, and then subsequently determine force values, based on the calculated position-force trajectory, to apply to the one or more piston assemblies over a specified time or position interval in order to achieve the desired engine performance. The force values may be applied to the one or more piston assemblies by, for example, exerting an electromagnetic force onto the one or more piston assembly. In some embodiments, the processing sub-system calculates the position-force trajectory based on the operating state of the free-piston engine. The operating state of a free-piston engine refers to the calculated, measured, or estimated values or indicators of the state of the engine (i.e., its dynamical system state) and any other suitable calculated, measured, or estimated values or indicators of the operating characteristics, performance, parameters, and environment of the engine. For example, one or more sensors could be used to measure pressure, temperature, forces, velocities, acceleration, position, any other suitable parameter or condition, or any combination thereof at respective sections or components of the free-piston engine. This sensor information can be processed by the processing sub-system to compute a position-force trajectory to achieve a desired engine performance.

In one suitable approach, the processing sub-system calculates a position-force trajectory for a piston assembly when a particular trigger is activated (e.g., in response to a particular event, at a particular threshold crossing, any other suitable trigger, or any combination thereof). In another suitable approach, the processing sub-system calculates a position-force trajectory repeatedly throughout an engine stroke or cycle. For example, the calculations may be performed at particular time intervals (e.g., 1 kHz, 10 kHz, etc.) or at particular discrete position intervals (e.g., every 1 millimeter, every 1 micron, etc.). In another suitable approach, as the operating state of the free-piston engine changes, the processing sub-system may calculate a new position-force trajectory.

The calculation of each position-force trajectory is made without regard to a deviation from a previously calculated trajectory (position-force trajectory, time-position trajectory, or any other suitable trajectory). It will be understood that a position-force trajectory calculation is determined using for example one or more calculations, one or more prescriptions, or any combination thereof, including, for example, the use of a look-up table, a curve-fitting, or both. This aspect allows for changes in and to the operating state of the free-piston engine (rapid or slow, intended or unintended) to be accounted for in each new position-force trajectory calculation, thereby providing a control technique for a free-piston engine that is capable of rejecting disturbances in the operating state of the free-piston engine. The calculation of each position-force trajectory may also be computed without regard to the timing of a desired engine performance. That is, each position-force trajectory is defined without a time component and is calculated without specifying the time in which a desired engine performance occurs (e.g., the time in which a piston assembly apices or otherwise reaches a target position). In some instances, with suitable assumptions about engine gas properties, conditions, and parameters, the calculation of a position-force trajectory may rely on a close-form solution. In other instances, the calculation of a position-force trajectory may rely on a numerically iterative solution (e.g., using a solver to calculate a solution).

In some embodiments, the current operating parameters of a free-piston engine may be estimated based on a preceding force applied to the one or more piston assemblies that was calculated as part of a previous position-force trajectory. The estimated engine operating parameters may be used in conjunction with the current position of the one or more piston assemblies to calculate a new position-force trajectory. For example, an immediately preceding force value as either determined or as actually applied to a piston assembly could be used to update an estimate of current gas pressure in a combustion section or driver section of a free-piston engine by, for example, applying a smoothing technique (e.g., IRR or FIR filter) to a previously estimated or measured gas pressure and adjusting for the change in gas pressure caused at least in part by the immediately preceding applied force. This aspect can avoid the need for expensive and unreliable sensors (e.g., pressure sensors) in a free-piston engine, thereby providing a low cost and high reliability control technique for a free-piston engine.

In some embodiments, for a free-piston engine with multiple piston assemblies (e.g., arranged as opposed-pistons with a shared combustion section), in addition to the processing sub-system calculating a position-force trajectory for each respective piston assembly, the processing sub-system may also calculate synchronization forces for the multiple piston assemblies and cause certain forces to be applied to the multiple piston assemblies based on the calculations to synchronize the movements of the multiple piston assemblies as desired.

In some embodiments, the processing sub-system may employ a hybrid control strategy that switches between multiple control techniques, wherein at least one of the control techniques is based on calculating a position-force trajectory as disclosed herein. The processing sub-system may, for example, utilize a position-force trajectory control technique during times when the operating state of the engine is unsteady (e.g., during engine start-up) and utilize a different, less robust, control technique during times when the operating state of the engine is sufficiently steady (e.g., delivering constant and steady power). The processing sub-system may, for example, switch from a less robust control technique to a more robust position-force trajectory control technique when an unintended change in the operating state of the engine is detected (e.g., a combustion misfire event, a higher than expected friction event, a change in fuel quality event, any other suitable change in the operating state of the engine, or any combination thereof). In some instances, a less robust control technique may rely on a time-position trajectory that is calculated based on a previously determined position-force trajectory (e.g., as measured during an entire engine stroke or cycle) that was calculated while the processing sub-system was previously employing a position-force trajectory control technique. In some instances, the less robust control technique may depend on a deviation from a previously determined trajectory (position-force trajectory, time-position trajectory, or any other suitable trajectory).

Generally, free-piston combustion engine configurations can be broken down into three categories: 1) two opposed pistons, single combustion chamber, 2) single piston, dual combustion chambers, and 3) single piston, single combustion chamber. A diagram of the three common free-piston combustion engine configurations is shown in FIG. 1. Several illustrative embodiments of linear free-piston combustion engines are illustrated in commonly assigned U.S. Pat. No. 8,662,029, issued on Mar. 4, 2014, and entitled "High-efficiency linear combustion engine," which is hereby incorporated by reference herein in its entirety. It will be understood that while the present disclosure is presented in the context of certain specific illustrative embodiments of linear free-piston combustion engines, the concepts discussed herein are applicable to any other suitable free-piston combustion engines, including, for example, non-linear free-piston engines. Free-piston engines generally include one or more free-piston assemblies that are free from mechanical linkages that translate the linear motion of the piston assembly into rotary motion (e.g., a slider-crank mechanism) or free from mechanical linkages that directly control piston dynamics (e.g., a locking mechanism). Free-piston engines have a number of benefits over such mechanically-linked piston engines, which lead to increased efficiency. For example, due to the inherent architectural limitations of mechanically-linked piston engines, free-piston engines can be configured with higher compression ratios and expansion ratios, which lead to higher engine efficiencies as, described in the previously referenced and incorporated U.S. Pat. No. 8,662,029. Moreover, free-piston engines allow for increased variability in the compression and expansion ratios, including allowing for the compression ratio to be greater than the expansion ratio and allowing for the expansion ratio to be greater than the compression ratio, which may also increase the engine efficiency. The free-piston engine architecture also allows for increased control of the compression ratio on an engine cycle-to-cycle basis, which allows for adjustments due to variable fuel quality and fuel type. Additionally, due to the lack of mechanical linkages, free-piston engines result in substantially lower side loads on the piston assemblies, which allows for oil-less operation, and in turn, reduced friction and losses resulting therefrom.

It will be understood that while the present disclosure is presented in the context of a free-piston internal combustion engine, the teachings and concepts presented herein are applicable to other types of free-piston devices, such as free-piston compressors in which combustion does not take place or free-piston compressors in which internal combustion does take place. In such systems without combustion, electrical energy is converted into mechanical energy by a LEM to compress a fluid (liquid or gaseous) in a compression chamber or compression section. In such systems with combustion, fuel energy is converted into mechanical energy, possibly in conjunction with the conversion of electrical energy, to compress a fluid in a compression chamber or compression section. Additionally, the teachings and concepts presented herein are applicable to free-piston heat engines which convert an external heat resource into electricity or to compress a fluid.

Figure 2:
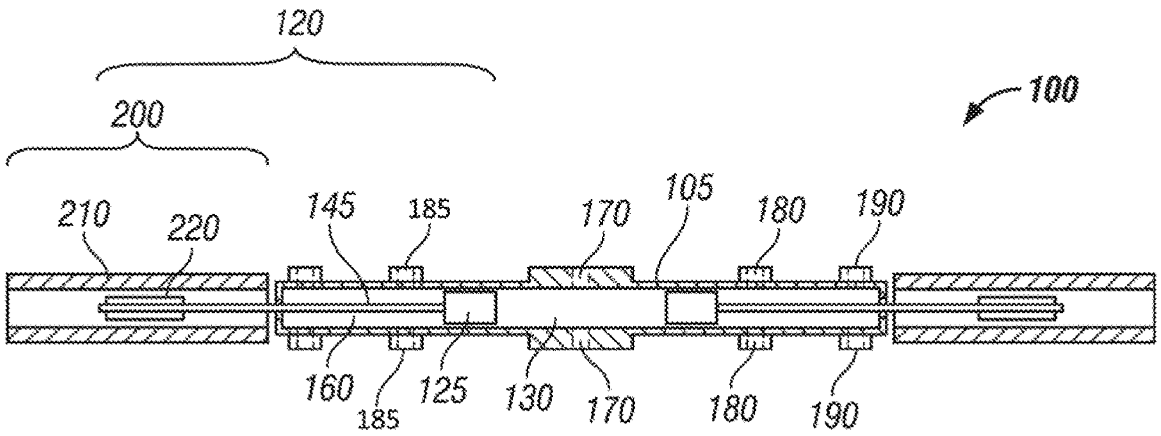
FIG. 2 is a cross-sectional drawing illustrating a two-piston, single-combustion section, integrated gas springs, and separated linear electromagnetic machine engine, in accordance with some embodiments of the present disclosure.

FIG. 2 is a cross-sectional drawing illustrating one embodiment of a two-piston, single-combustion section, integrated gas springs, and separated LEM free-piston internal combustion engine 100. This free-piston, internal combustion engine 100 directly converts the chemical energy in a fuel into electrical energy via an LEM 200. As used herein, the term "fuel" refers to matter that reacts with an oxidizer. Such fuels include, but are not limited to: (i) hydrocarbon fuels such as natural gas, biogas, gasoline, diesel, and biodiesel; (ii) alcohol fuels such as ethanol, methanol, and butanol; (iii) hydrogen; and (iv) mixtures of any of the above. The engines described herein are suitable for both stationary power generation and mobile power generation (e.g., for use in vehicles).

Engine 100 includes a cylinder 105 with two opposed piston assemblies 120 dimensioned to move within the cylinder 105 and meet at a combustion section 130 in the center of the cylinder 105. Each piston assembly 120 may include a piston 125 and a piston rod 145. The piston assemblies 120 are free to move linearly within the cylinder 105.

With further reference to FIG. 2, the volume between the backside of the piston 125, piston rod 145, and the cylinder 105 is referred to herein as the driver section 160. As used herein, a "driver section" refers to a section of an engine cylinder capable of storing energy and providing energy to displace the piston assembly without the use of combustion. The driver section 160, in some embodiments, may contain a non-combustible fluid (i.e., gas, liquid, or both). In the illustrated embodiment, the fluid in the driver section 160 is a gas that acts as a gas spring. Driver section 160 stores energy from an expansion stroke of the piston cycle and provides energy for a subsequent stroke of the piston cycle, i.e. the stroke that occurs after an expansion stroke. For example, kinetic energy of the piston may be converted into potential energy of the gas in the driver section during an expansion stroke of the engine. In some embodiments, the potential energy stored in the driver section can be sufficient to perform the compression stroke (or an exhaust stroke or any other suitable stroke occurring subsequent to the expansions stroke) without, for example, any additional net electrical input by a motor force. As used herein, the term "piston cycle" refers to any series of piston movements that begin and end with the piston 125 in substantially the same configuration. One common example is a four-stroke piston cycle, which includes an intake stroke, a compression stroke, an expansion stroke, and an exhaust stroke. Additional alternate strokes may form part of a piston cycle as described throughout this disclosure. A two-stroke piston cycle is characterized as having an expansion stroke and a compression stroke. As used herein, an "expansion stroke" refers to a stroke of a piston cycle during which the piston assembly moves from a top-dead-center ("TDC") position to a bottom-dead-center ("BDC") position, where TDC refers to the position of the piston assembly, or assemblies, when the combustion section volume is at a minimum and BDC refers to the position of the piston assembly, or assemblies, when the combustion section volume is at a maximum. As noted above, since the compression ratio and expansion ratio of a free-piston engine can vary or be varied from cycle-to-cycle, the TDC and BDC positions can also vary or be varied from cycle-to-cycle, in some embodiments. Accordingly, as will be described below in further detail, an expansion stroke may refer to an intake stroke, an expansion stroke, or both. In some embodiments, the amount of energy to be stored by the driver section during an expansion stroke may be determined based on various criteria and controlled by a controller and associated processing circuitry as will be described below in further detail.

For purposes of brevity and clarity, the driver section will primarily be described herein in the context of a gas spring and may be referred to herein as the "gas section," "gas springs" or "gas springs section." It will be appreciated that in some arrangements, the driver section 160 may include one or more other mechanisms in addition to or in place of a gas spring. For example, such mechanisms can include one or more mechanical springs, magnetic springs, or any suitable combination thereof. In some arrangements, a highly efficient linear alternator may be included that operates as a motor, which may be used in place of or in addition to a spring (pneumatic, hydrodynamic, or mechanical) for generating compression work. It will be understood by those skilled in the art that in some embodiments, the geometry of the driver section may be selected to minimize losses and maximize the efficiency of the driver section. For example, the diameter and/or dead volume of the driver section may be selected to minimize losses and maximize the efficiency of the driver section. As used herein, the term "dead volume" refers to the volume of the driver section when the piston assembly is at its furthest possible BDC position (i.e., when the volume of the combustion section is at its greatest before the piston assembly contacts a physical stop). In some embodiments, for example, if the driver section is a gas or hydraulic spring, the diameter of the section may be different than the combustion section in order to provide for increased efficiency. Certain embodiments of gas springs will be described below in further detail with reference to FIGS. 8-12.

Combustion ignition can be achieved via, for example, compression ignition and/or spark ignition. Fuel can be directly injected into the combustion chamber 130 ("direct injection") or intake ports 180 ("port fuel injection") via fuel injectors and/or mixed with air prior to and/or during air intake ("premixed injection"). The engine 100 can operate with lean, stoichiometric, or rich combustion using liquid fuels, gaseous fuels, or both, including hydrocarbons, hydrogen, alcohols, or any other suitable fuels as described above.

Cylinder 105 may include injector ports 170, intake ports 180, exhaust ports 185, and driver gas exchange ports 190, for exchanging matter (solid, liquid, gas, or plasma) with the surroundings. As used herein, the term "port" includes any opening or set of openings (e.g., a porous material) which allows matter exchange between the inside of the cylinder 105 and its surroundings. It will be understood that the ports shown in FIG. 2 are merely illustrative. In some arrangements, fewer or more ports may be used. The above-described ports may or may not be opened and closed via valves. The term "valve" may refer to any actuated flow controller or other actuated mechanism for selectively passing matter through an opening. Valves may be actuated by any means, including but not limited to: mechanical, electrical, magnetic, camshaft-driven, hydraulic, or pneumatic means. The number, location, and types of ports and valves may depend on the engine configuration, injection strategy, and piston cycle (e.g., two- or four-stroke piston cycles). In some embodiments, the matter exchange of the ports may be achieved by the movement of the piston assembly, which may cover and/or uncover the ports as necessary to allow exchange of matter.

In some embodiments, the operation of driver section 160 may be adjustable. In some embodiments, driver gas exchange ports 190 may be utilized to control characteristics of the driver section. For example, driver gas exchange ports 190 may be used to control the amount, temperature, pressure, any other suitable characteristics, and/or any combination thereof of the gas in the driver section. In some embodiments, adjusting any of the aforementioned characteristics and thus adjusting the amount of mass in the cylinder may vary the effective spring constant of the gas spring. In some embodiments, the geometry of driver section 160 may be adjusted to obtain desirable operation. In some embodiments, the dead volume within the cylinder may be adjusted to vary the spring constant of the gas spring. It will be understood that any of the aforementioned control and adjustment of the driver section 160 and the gas therein may provide for control of the amount of energy stored by driver section 160 during an expansion stroke of engine 100. It will also be understood that the aforementioned control of the characteristics of the gas in driver section 160 also provides for variability in the frequency of engine 100.

Engine 100 includes a pair of LEMs 200 for directly converting the kinetic energy of the piston assemblies 120 into electrical energy (e.g., during a compression stroke, during an expansion stroke, during an exhaust stroke, and/or during an intake stroke). Each LEM 200 is also capable of directly converting electrical energy into kinetic energy of the piston assembly 120. In some embodiments, the LEMs 200 may convert electrical energy into kinetic energy of the piston in order to start-up the engine, but need not convert electrical energy into kinetic energy during operation once the engine has started and sufficient fuel chemical energy is being converted into kinetic energy of the piston, at least part of which may be stored in the driver section 160 during expansion strokes. In some embodiments, start-up of the engine may be achieved by any other suitable technique, including, for example, the use of stored compressed gas. As illustrated, the LEM 200 includes a stator 210 and a translator 220. Specifically, the translator 220 is coupled to the piston rod 145 and moves linearly within the stator 210, which may remain stationary. In addition, the LEM 200 can be a permanent magnet machine, an induction machine, a switched reluctance machine, or any combination thereof. The stator 210 and translator 220 can each include magnets, coils, iron, or any suitable combination thereof. Because the LEM 200 directly transforms the kinetic energy of the pistons to and from electrical energy (i.e., there are no mechanical linkages), the mechanical and frictional losses are minimal compared to conventional engine-generator configurations. Furthermore, because the LEM 200 is configured to convert portions of the kinetic energy of the piston assemblies into electrical energy during any stroke of a piston cycle, and engine 100 includes an adjustable driver section 160 configured to store energy from an expansion stroke that can be converted to electrical energy during a subsequent stroke, the LEM 200 may be configured to have a lower electrical capacity than, for example, an LEM or other device that requires conversion of all energy within a single stroke of a piston cycle (e.g., only within the expansion stroke). Accordingly, in some embodiments, the associated linear alternator and power electronics of the LEM 200 may be reduced in size, weight, and/or electrical capacity. This may result in decreased size and cost of components, increased efficiency, increased reliability, and increased utilization as will be understood by one of ordinary skill in the art. Accordingly, the frequency and therefore power output of the engine may be increased in some embodiments.

It will be understood by one of ordinary skill in the art that each LEM 200 may be operated as both a generator and a motor. For example, when LEMs 200 convert kinetic energy of piston assemblies 120 into electrical energy they operate as generators. When acting as generators, the forces applied to translators 220 are in the opposite direction of the motion of piston assemblies 120. Conversely, when LEMs 200 convert electric energy into kinetic energy of piston assemblies 120 they operate as motors. When acting as motors, the forces applied to translators 220 are in the same direction as the motion of piston assemblies 120. For ease of reference, the center line in FIG. 2 (near injector ports 170) and corresponding figures may be considered the origin, with the positive direction for each piston assembly being away from the center, in the outward direction.

Figure 3:
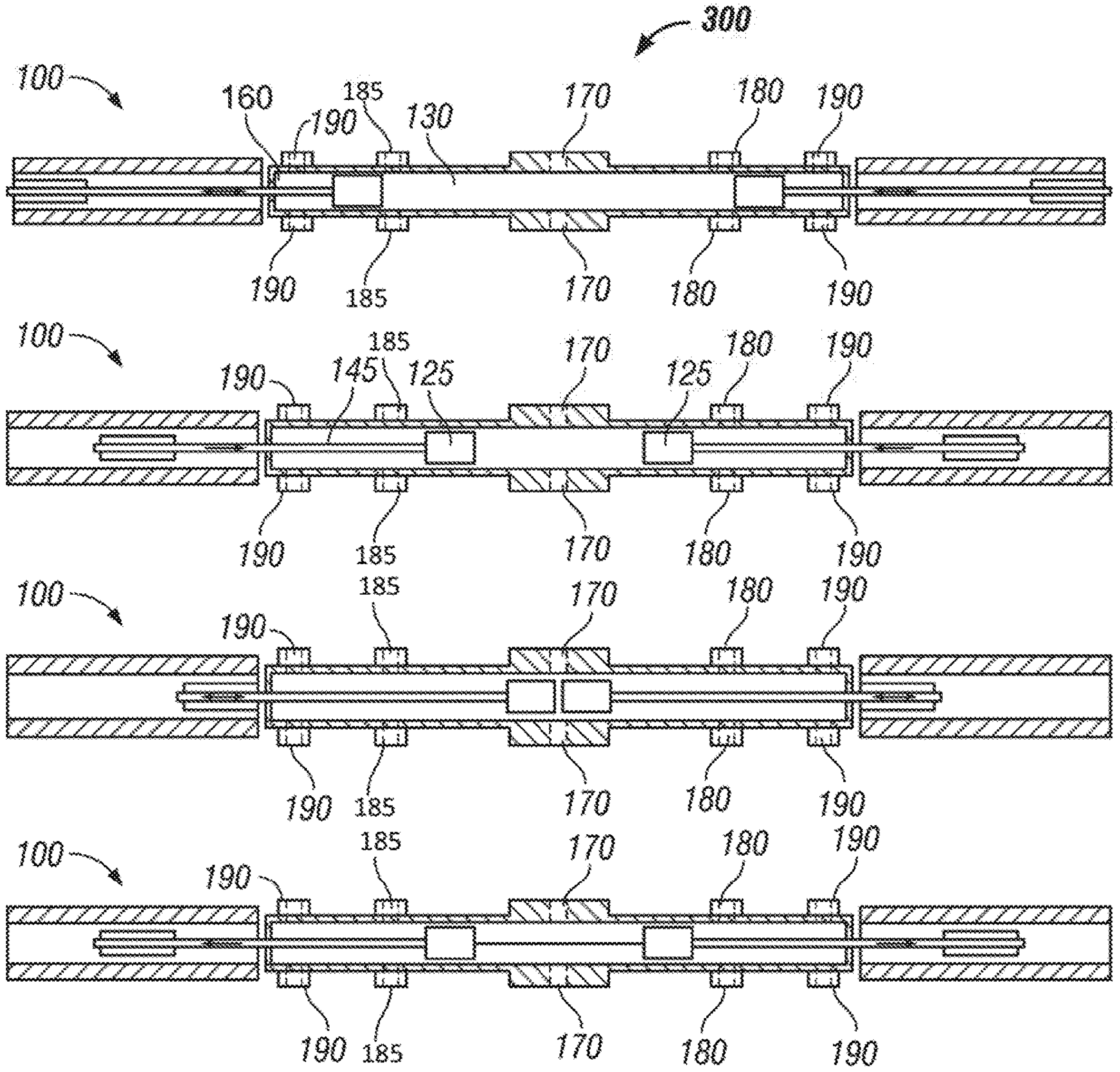
FIG. 3 is a diagram illustrating the two-stroke piston cycle of the two-piston integrated gas springs engine of FIG. 2, in accordance with some embodiments of the present disclosure.

The embodiment shown in FIG. 2 operates using a two-stroke piston cycle. A diagram illustrating the two-stroke piston cycle 300 of the two-piston integrated gas springs engine 100 of FIG. 2 is illustrated in FIG. 3. As illustrated in FIG. 3, engine 100 may operate using a two-stroke piston cycle including a compression stroke and an expansion stroke, with the pistons located at BDC prior to the compression stroke, and at top-dead-center TDC prior to the expansion stroke. As used herein with reference to the two-piston embodiment, BDC may refer to the point at which the pistons are furthest from each other. As used herein with reference to the two-piston embodiment, TDC may refer to the point at which the pistons are closest to each other. When at or near BDC, and if the driver section is to be used to provide compression work, the pressure of the gas within the driver section 160 is greater than the pressure of the combustion section 130, which forces the pistons 125 away from BDC and inwards towards each other, i.e., in the negative direction. The gas in the driver section 160 can be used to provide some or all of the energy required to perform a compression stroke. As described above, in some embodiments, the piston 125 may be forced away from BDC by any other suitable mechanism, including a mechanical spring, a magnetic spring, or any other suitable mechanism that may be used to provide compression work. While the LEM 200 may also provide some of the energy required to perform a compression stroke, in a preferred embodiment, when sufficient energy is being produced during combustion, enough energy may be stored in the driver section 160 such that LEM 200 need not convert any electrical energy into kinetic energy of the piston 125 because the energy stored in driver section 160 may be transferred to the piston to provide the requisite compression work. The LEM 200 may also extract energy during the compression stroke. For example, if the gas in the driver section 160 (or other suitable means as described above) provides excess energy for performing the compression stroke, the LEM 200 may convert a portion of the kinetic energy of the piston assembly 120 into electrical energy.

The amount of energy required to perform a compression stroke may depend on the desired compression ratio, the pressure and temperature of the combustion section 130 at the beginning of the compression stroke, the mass of the piston assembly 120, system losses, as well as other properties and operating conditions of the engine. As described above, driver section 160 may provide all of the energy needed for the compression stroke so that no other energy input (from LEM 200 or any other source) is necessary. In some embodiments, some energy may be input during the compression stroke from the LEM 200, but the net energy during the compression stroke is still positive (e.g., more energy converted to electricity than input over the stroke). A compression stroke continues until combustion occurs, which typically occurs at a time when the velocities of the pistons 125 are at or near zero. Combustion causes an increase in the temperature and pressure within the combustion section 130, which forces the pistons 125 outward toward the LEMs 200. During an expansion stroke, a portion of the kinetic energy of the piston assembly 120 may be converted into electrical energy by the LEM 200 and another portion of the kinetic energy does compression work on the gas (or other compression mechanism) in the driver section 160. Alternatively, all of the kinetic energy of the piston assembly may be stored in driver section 160. An expansion stroke continues until the velocities of the pistons 125 are zero. After the expansion stroke and before the subsequent compression stroke, with pistons 125 at or near BDC, the engine may exhaust combustion products and intake air, an air/fuel mixture, or an air/fuel/combustion products mixture. This process may be referred to herein as "breathing" or "breathing at or near BDC." It will be appreciated by those of ordinary skill in the art that breathing may be achieved in any suitable manner, such as uni-flow or cross-flow scavenging, as described in previously referenced and incorporated U.S. Pat. No. 8,662,029. It will also be appreciated that although described as occurring after the expansion stroke, in some embodiments breathing may occur during the end of the expansion stroke and/or the beginning of the compression stroke. Similarly, in some embodiments, combustion may occur during the end of the compression stroke and/or the beginning of the expansion stroke.

FIG. 3 illustrates one exemplary port configuration 300 in which the intake ports 180 and exhaust ports 185 are in front of both pistons near BDC. The opening and closing of the exhaust ports 185 and intake ports 180 may be independently controlled. The location of the exhaust ports 185 and intake ports 180 can be chosen such that a range of compression ratios and/or expansion ratios is possible. The times in a cycle when the exhaust ports 185 and intake ports 180 are activated (opened and closed) can be adjusted during and/or between cycles to vary the compression ratio and/or expansion ratio and/or the amount of combustion product retained in the combustion section 130 at the beginning of a compression stroke. Retaining combustion gases in the combustion section 130 is called residual gas trapping (RGT) and can be utilized to effect combustion timing, peak combustion temperatures, and other combustion and engine performance characteristics. Alternatively, or in addition, exhaust gas recirculation (EGR) can be used to recirculate combustion gasses in order to effect combustion timing, peak combustion temperatures, and other combustion and engine performance characteristics.

Although operation of a two-stroke cycle is described above, the embodiment of FIG. 2 may also be operated using a four-stroke piston cycle, which includes an intake stroke, a compression stroke, a power (expansion) stroke, and an exhaust stroke. In some embodiments, any suitable modification may be made to operate using a four-stroke piston cycle. For example, as described in the previously referenced and incorporated U.S. Pat. No. 8,662,029, the location of the ports may be modified to operate the engine using a four-stroke piston cycle.

In some embodiments, in a four-stroke piston cycle, just as in the two-stroke cycle described above, driver section 160 may provide all of the work necessary for the compression stroke. In some embodiments, the driver section 160 may provide enough work to avoid net electrical energy input during the compression stroke. In some embodiments, the driver section 160 may provide enough work to allow for net electrical energy output during the compression stroke. The compression stroke may continue until combustion occurs, e.g., when the velocities of pistons 125 are at or near zero. Combustion may be followed by a power stroke, during which kinetic energy of the piston assemblies 120 may be stored in driver section 160 and/or converted into electrical energy by LEMs 200 as described above with respect to the two-stroke cycle. At some point at or near the power-stroke BDC, exhaust ports may be opened, and an exhaust stroke may occur until the velocities of pistons 125 are at or near zero, which marks the exhaust stroke TDC for that cycle. As described above, the energy stored in driver section 160 during the expansion stroke may provide the work required to perform the exhaust stroke. At some point prior to reaching exhaust stroke TDC, the combustion section 130 closes the exhaust valves while there is still exhaust in the cylinder. In some embodiments, this trapped exhaust gas may store enough energy to perform the subsequent intake stroke. As with the expansion stroke, the kinetic energy of the piston assemblies 120 may be stored in driver section 160 and/or converted into electrical energy by LEMs 200 during the intake stroke, which occurs until the velocities of the pistons 125 are at zero. In some embodiments, driver section 160 may store enough energy during the intake stroke to perform the subsequent compression stroke. In some embodiments, any suitable amount of energy stored in the driver section in excess of the amount required for a subsequent compression stroke or a subsequent exhaust stroke may be converted into electrical energy by LEMs 200.

Figure 4:
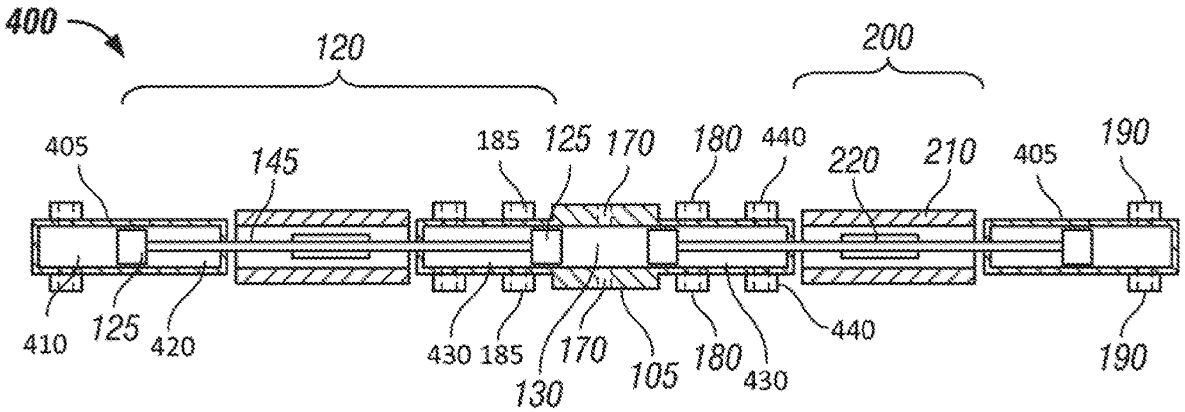
FIG. 4 is a cross-sectional drawing illustrating an alternative two-piston, separated gas springs, and separated linear electromagnetic machine engine, in accordance with some embodiments of the present disclosure.

FIG. 4 is a cross-sectional drawing illustrating an alternative two-piston, separated gas springs, and separated LEM engine, in accordance with the principles of the disclosure. It will be understood that the illustrated configuration is merely for purposes of example, and that any other suitable configuration of a two-piston, separated gas springs, and separated LEM engine may be used in accordance with the present disclosure. Engine 400 includes a main cylinder 105, two opposed piston assemblies 120, and a combustion section 130 located in the center of main cylinder 105. The illustrated engine 400 has certain physical differences when compared with engine 100. Specifically, engine 400 includes a pair of outer cylinders 405 that contain additional pistons 125, and the LEMs 200 are disposed between the main cylinder 105 and the outer cylinders 405. Each outer cylinder 405 includes a driver section 410 located between the piston 125 and the distal end of the outer cylinder 405 and a driver back section 420 located between the piston 125 and the proximal end of the outer cylinder 405. Main cylinder 105 includes a pair of combustion back sections 430 disposed between the pistons 125 and the distal ends of the main cylinder 105. In some embodiments, the driver back section 420 and the combustion back section 430 are maintained at or near atmospheric pressure. In some embodiments, the driver back section 420 and the combustion back section 430 are not maintained at or near atmospheric pressure. In the illustrated configuration, the main cylinder 105 has ports 440 for removal of blow-by gas, injector ports 170, intake ports 180, and exhaust ports 185. Driver gas exchange ports 190 are located in the outer cylinders 405. Each piston assembly 120 includes two pistons 125 and a piston rod 145. The piston assemblies are free to move linearly between the main cylinder 105 and the outer cylinders 405 as depicted in FIG. 4. It will be understood that the embodiment of FIG. 4 can operate using a two-stroke piston cycle using, for example, the methodology as set forth above with respect to FIG. 3, and a four-stroke piston cycle as described above and in previously referenced and incorporated U.S. Pat. No. 8,662,029.

The configuration of FIGS. 2 and 3, as shown, includes a single unit referred to as the engine 100 and defined by the cylinder 105, the piston assemblies 120 and the LEMs 200. Similarly, the configuration of FIG. 4, as shown, includes a single unit referred to as the engine 400 and defined by the main cylinder 105, the piston assemblies 120, the outer cylinders 405, and the LEMs 200. However, multiple units can be placed in parallel, which could collectively be referred to as "the engine." This type of modular arrangement in which engine units operate in parallel may be used to enable the scale of the engine to be increased as needed by the end user. Additionally, not all units need be the same size, operate under the same conditions (e.g., frequency, stoichiometry, or breathing), or operate simultaneously (e.g., one or several units could be deactivated while one or several other units operate). When the units are operated in parallel, there exists the potential for integration between the engines, such as, but not limited to, gas exchange between the units and/or feedback between the units' respective LEMs 200.

Figure 5:
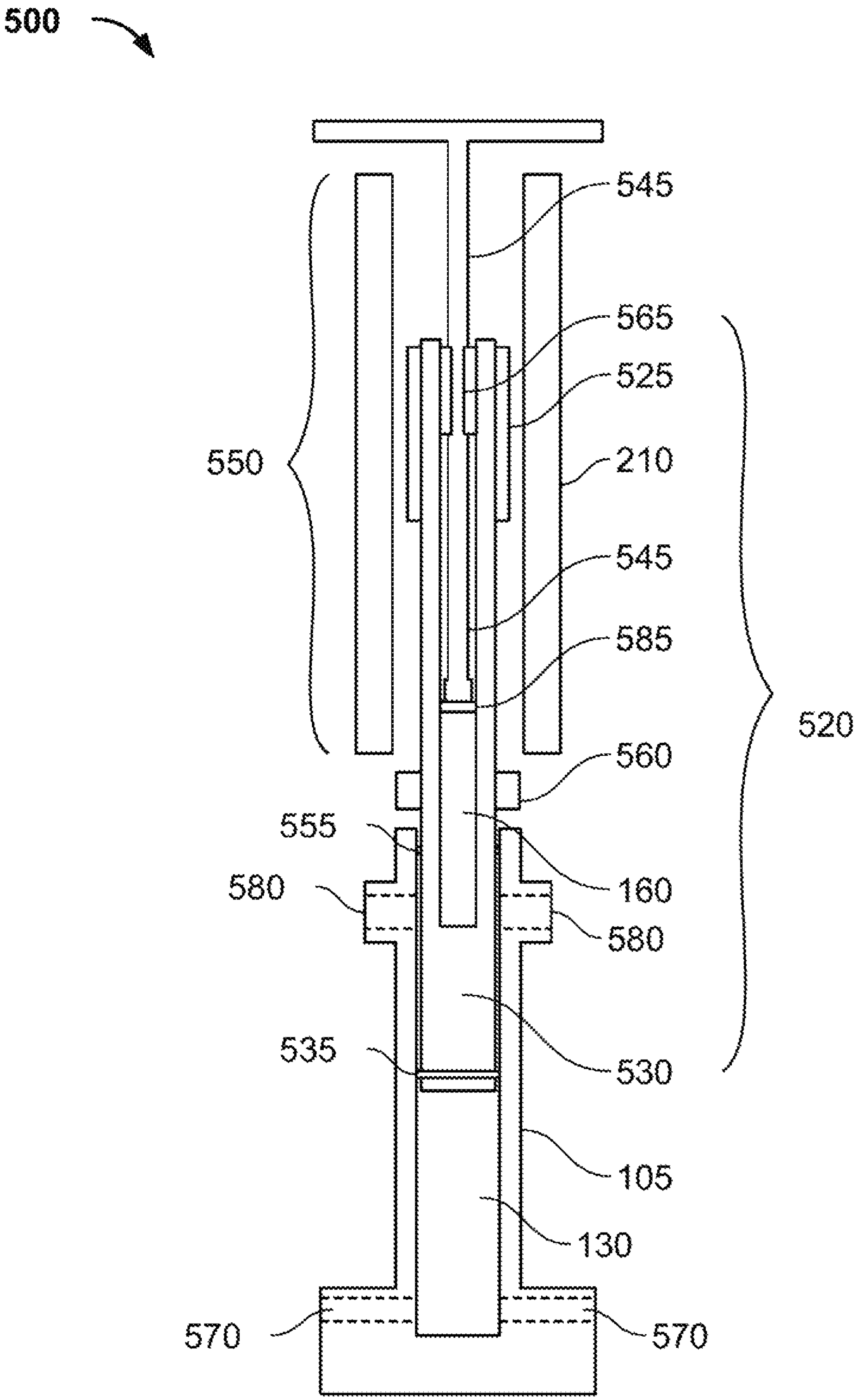
FIG. 5 is a cross-sectional drawing illustrating a single-piston, integrated internal gas spring engine, in accordance with some embodiments of the present disclosure.
Figure 6:
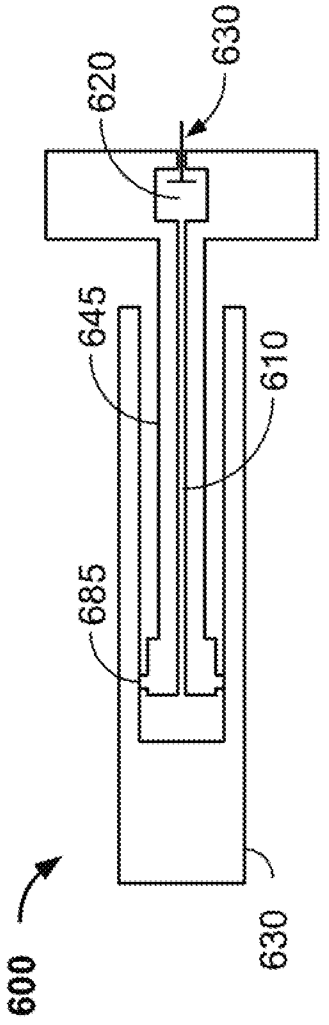
FIG. 6 is a cross-sectional drawing illustrating an embodiment of a gas spring rod, in accordance with some embodiments of the present disclosure.
Figure 7:
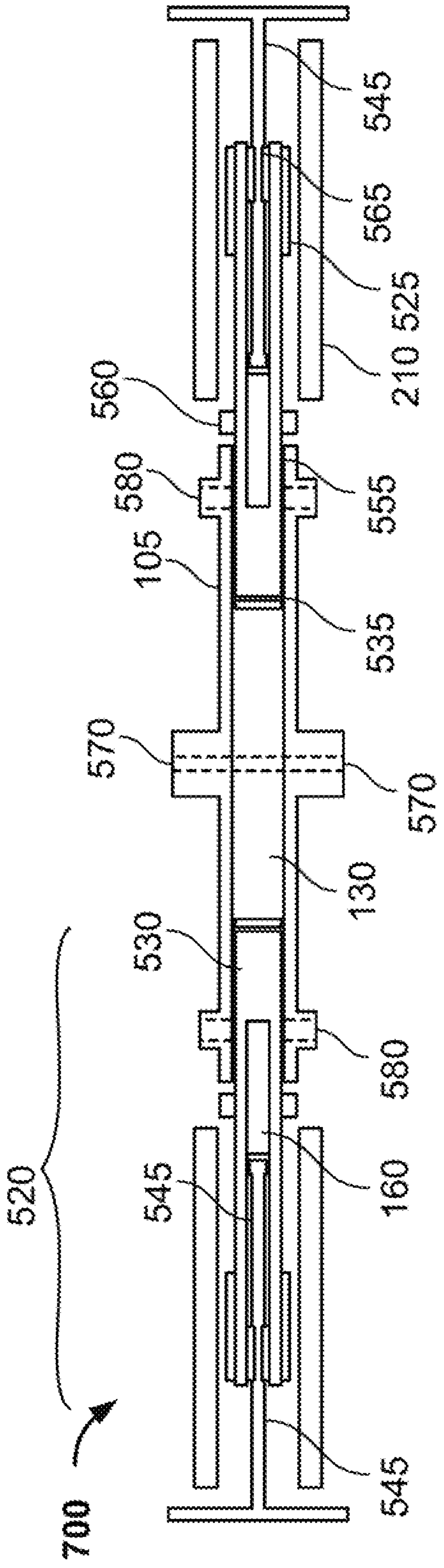
FIG. 7 is a cross-sectional drawing illustrating a two-piston, integrated internal gas springs engine, in accordance with some embodiments of the present disclosure.

FIGS. 5-7 illustrate further embodiments featuring integrated internal gas springs in which the gas spring is integrated inside of the piston assembly and the LEM is separated from the combustor cylinder. As illustrated in FIGS. 5-7, the integrated internal gas spring (IIGS) architecture may be similar in length to the integrated gas spring with separated LEM architecture illustrated in FIGS. 2-3. However, the IIGS architecture may eliminate issues with respect to the blow-by gases from the combustion section entering the gas spring, which also occurs in the fully integrated gas spring and LEM architecture.

FIG. 5 is a cross-sectional drawing illustrating a single-piston, integrated internal gas spring engine, in accordance with some embodiments of the present disclosure. Many components such as the combustion section 130 are similar to the components in previous embodiments (e.g., FIGS. 1 and 2), and are labeled accordingly. The engine 500 comprises a cylinder 105 with piston assembly 520 dimensioned to move within the cylinder 105 in response to reactions within combustion section 130 near the bottom end of the cylinder 105. Piston assembly 520 comprises a piston 530, piston seals 535, and a spring rod 545. The piston assembly 520 is free to move linearly within the cylinder 105. In the illustrated embodiment, the piston rod 545 moves along bearings 560 and is sealed by piston rod seals 555 that are fixed to the cylinder 105. The cylinder 105 includes exhaust/injector ports 570, 580 for intake of air, fuel, exhaust gases, air/fuel mixtures, and/or air/exhaust gases/fuel mixtures, exhaust of combustion products, and/or injectors. Some embodiments do not require all of the ports depicted in FIG. 5. The number and types of ports depends on the engine configuration, injection strategy, and piston cycle (e.g., two- or four-stroke piston cycles).

In the illustrated embodiment, the engine 500 further comprises an LEM 550 (including stator 210 and magnets 525) for directly converting the kinetic energy of the piston assembly 520 into electrical energy. It will be understood that LEM 550 may be configured to operate substantially the same as LEMs 200 described above with respect to FIGS. 2-4.

With further reference to FIG. 5, piston 530 comprises a solid front section (combustor side) and a hollow back section (gas spring side). The area inside of the hollow section of the piston assembly 520, between the front face of piston 530 and spring rod 545, comprises a gas that serves as the gas spring 160, which provides at least some of the work required to perform a compression stroke. Piston 530 moves linearly within the combustion section 130 and the stator 210 of the LEM 550. The piston's motion is guided by bearings 560, 565, which may be solid bearings, hydraulic bearings, and/or air bearings. In the illustrated embodiment, the engine 500 includes both external bearings 560 and internal bearings 565. In particular, the external bearings 560 are located between the combustion section 130 and the LEM 550, and the internal bearings 565 are located on the inside of the hollow section of the piston 530. The external bearings 560 are externally fixed and do not move with the piston 530. The internal bearings 565 are fixed to the piston 530 and move with the piston 530 against the spring rod 545.

With continued reference to FIG. 5, the spring rod 545 serves as one face for the gas spring 160 and is externally fixed. The spring rod 545 has at least one seal 585 located at or near its end, which serves the purpose of keeping gas within the gas spring section 160. Magnets 525 are attached to the back of the piston assembly 520 and move linearly with the piston assembly 520 within the stator 210 of the LEM 550. The piston assembly 520 may have seals to keep gases in the respective sections. The illustrated embodiment includes (i) front seals 535 that are fixed to the piston 530 at or near its front end to keep to gases from being transferred from the combustion section 130, and (ii) back seals 555 that are fixed to the cylinder 105 and keep intake gases and/or blow-by gases from being transferred to the surroundings.

FIG. 6 is a cross-sectional drawing illustrating an embodiment of a gas spring rod, in accordance with some embodiments of the present disclosure. Specifically, the spring rod 645 includes a central lumen 610 that allows mass to be transferred between the gas spring section 160 to a reservoir section 620 that is in communication with the surroundings. The communication with the surroundings is controlled through a valve 630. The amount of mass in the gas spring 645 may be regulated to control the pressure within the gas spring 645 in accordance with some embodiments of the present disclosure.

FIG. 7 is a cross-sectional drawing illustrating a two-piston, integrated internal gas springs engine, in accordance with some embodiments of the present disclosure. Most of the elements of the two-piston embodiment are similar to those of the single-piston embodiment of FIG. 5, and like elements are labeled accordingly. In addition, the operating characteristics of the single- and two-piston embodiments are similar as described in previous embodiments, including all the aspects of the linear alternator, breathing, combustion strategies, etc.

Figure 8:
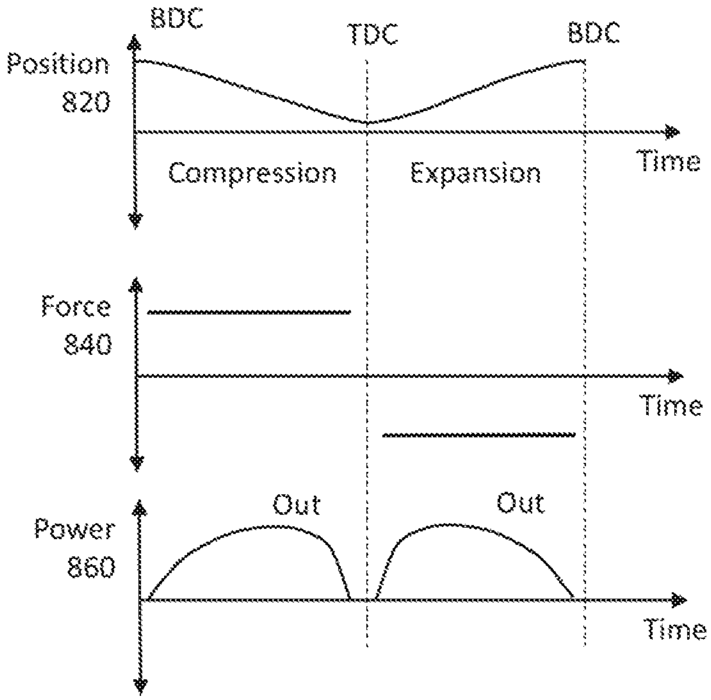
FIG. 8 illustrates exemplary position, force, and power diagrams of a free-piston engine over a compression and an expansion stroke, in accordance with some embodiments of the present disclosure.

FIG. 8 illustrates the position, force, and power of a free-piston engine, in accordance with some embodiments of the present disclosure. As shown, FIG. 8 illustrates exemplary position 820, force 840, and power 860 diagrams over time for a free-piston engine with a two-stroke piston cycle including a compression stroke and a expansion stroke. With reference to position diagram 820, as labeled in FIG. 8, for reference purposes, the positive direction corresponds to the direction from TDC to BDC. For example, in the free-piston assemblies of FIGS. 2-4, the centerline would correspond to the origin, and the direction away from the centerline would be the positive direction for each free-piston assembly. As can be seen by position diagram 820, the piston assembly starts the compression stroke at BDC and progresses to TDC, at which point the expansion (or power) stroke begins. During the expansion stroke, the piston assembly progresses back to BDC.

With reference to force diagram 840, the force is positive when applied in a direction from TDC to BDC. For example, in the free-piston assemblies of FIGS. 2-4, force applied in the direction away from the centerline would be a positive force. As can be seen in force diagram 840, during the compression stroke, a relatively constant positive force may be applied to the piston assembly, and during the expansion stroke, the force may be negative (in the direction towards the centerline), allowing the LEM to extract energy during both strokes. It will be understood that the force applied need not be constant, and that in some embodiments, a variable force profile may be applied, for example, to produce a relatively constant power output. It will also be understood that in some embodiments, and as depicted herein, forces may not be applied when the piston assembly velocity is relatively low, due to the inefficiency of doing so.

The power output is the negative product of the force and velocity of the piston assembly. Referring specifically to power diagram 860, it can be seen that, in the ideal case illustrated, no power need be input to the system in order to perform the compression and expansion strokes of the piston cycle. Rather, as described above, in the ideal case, there is sufficient energy stored in the at least one driver section during the expansion stroke to perform the subsequent compression stroke without additional energy input into the system during the compression stroke.

Figure 9:
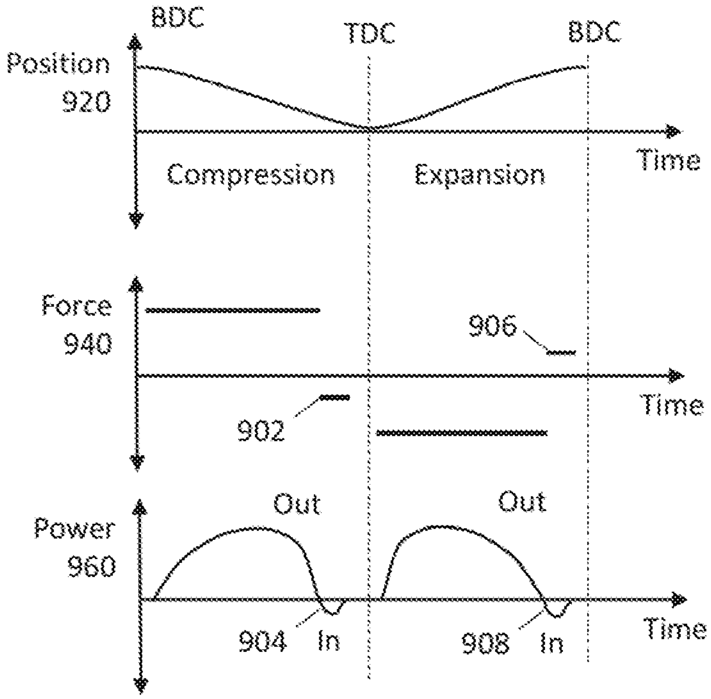
FIG. 9 illustrates other exemplary position, force, and power diagrams of a free-piston engine over a compression and an expansion stroke, in accordance with some embodiments of the present disclosure.

While in an ideal scenario, it may be desirable to avoid any power input during the compression and expansion strokes as described with respect to FIG. 8, in some embodiments it may be necessary or desirable to provide some power input. Accordingly, FIG. 9 illustrates the position, force, and power of a free-piston engine, in accordance with some other embodiments of the present disclosure. Similar to FIG. 8, FIG. 9 illustrates exemplary position 920, force 940, and power 960 diagrams over time for a free-piston engine with a two-stroke piston cycle including a compression stroke and a expansion stroke. While the position diagram 920 is generally similar to that of position diagram 820 illustrated in FIG. 8, it will be understood that the force diagram 940 and the power diagram 960 may differ from those illustrated in FIG. 8. With reference to force diagram 940 during the compression stroke, it can be seen at 902 that a force may be applied in the opposite direction as originally applied for a brief period. This is also reflected in power diagram 960, where a negative power showing power input for the same brief period may be seen at 904. While this force application and power input may occur for a number of reasons, in some embodiments, this may be done in order to control the speed of the piston assembly or otherwise ensure that the piston assembly reaches the appropriate or desired TDC position before the subsequent expansion stroke. For example, a force may be applied to increase the speed of the piston assembly. Similarly, with further reference to force diagram 940 during the expansion stroke, it can be seen at 906 that a force may be applied in the opposite direction as the rest of the expansion stroke for a brief period, which is also reflected in power diagram 960, where a negative power showing power input for the same brief period may be seen at 908. As described above, this applied force and input power may occur for a number of reasons, but in some embodiments, force may be applied in this way and power input in order to control the speed of the piston assembly or otherwise ensure that the piston assembly reaches the appropriate or desired BDC position before the subsequent compression stroke. For example, a force may be applied to increase the speed of the piston assembly as described above.

Although the provision of input power during compression stroke and/or expansion stroke described with respect to FIG. 9 is not necessarily ideal operation, it will be understood that the net electrical energy output over each stroke is still greater than zero (i.e., there is no net electrical energy input over each stroke). This is evident from power diagram 960, in which it can be seen that the integral over each stroke, represented by the area of the curve above zero subtracted by the area of the curve below zero, is substantially greater than zero. Accordingly, the amount of electrical energy output by the system over each stroke is greater than the electrical energy input to control the piston assembly position as described above. As used herein, the "net electrical energy" refers to the electrical energy transfer into or out of the LEM such as that described above with respect to FIGS. 2-4. In some embodiments, the LEM may include a stator coupled to power electronics (including, e.g., a DC bus, IGBTs, capacitors, and/or any other suitable components), batteries, and/or a grid-tie inverter. Accordingly, in some embodiments, while some electrical energy may be input into the LEM via power electronics, batteries, and/or a grid-tie inverter coupled to the LEM, the net electrical energy over a given stroke as described above would be output from the LEM to the power electronics, batteries, and/or grid-tie inverter.

Figure 14:
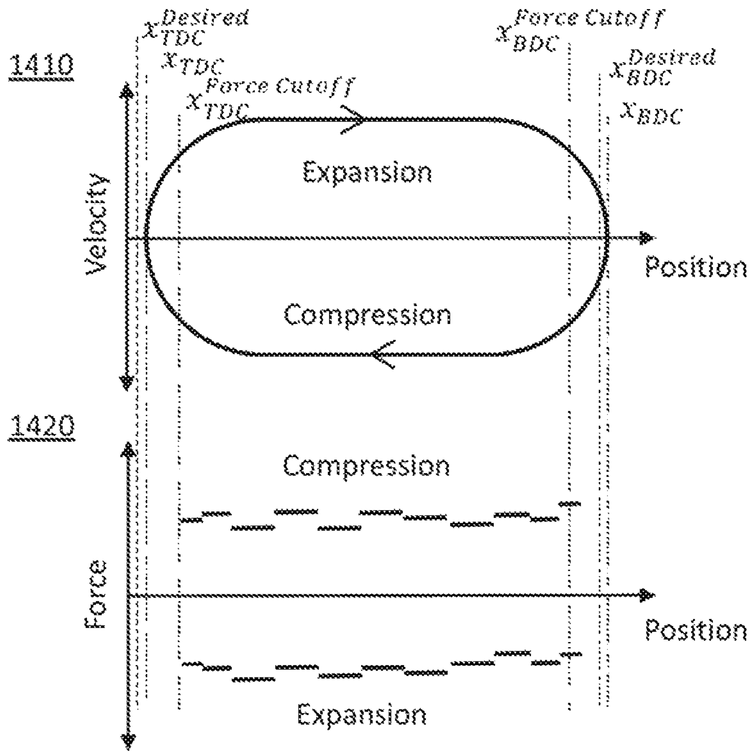
FIG. 14 illustrates other exemplary position-velocity and position-force trajectories of a free-piston engine over a compression and an expansion stroke, in accordance with some embodiments of the present disclosure.

While FIGS. 8 and 14 illustrate operation of the free-piston engine with no net electrical input over a given stroke, it is understood that the principles of the present disclosure can be applied to any suitable free-piston engine, including a free-piston engine that operates with net electrical input during a stroke, such as during a compression stroke (e.g., during start up).

As stated, the embodiment described above with respect to FIGS. 2-4 includes a two-piston, single-combustion section, two-stroke internal combustion engine 100. Described below, and illustrated in the corresponding figures, is a control system applicable to a free-piston combustion engine generally. Accordingly, as described above, the control system is applicable to other free-piston combustion engine architectures, such as those described in the previously referenced and incorporated U.S. Pat. No. 8,662,029. As would be appreciated by those of ordinary skill in the art, various modifications and alternative configurations may be utilized, and other changes may be made, without departing from the scope of the disclosure. For example, in addition to the two-piston architectures described above with respect to FIGS. 2-4, the control system described herein is applicable to, for example, single-piston architectures. Similarly, in addition to the two-stroke engine described above with respect to FIG. 3, the control system described herein is also applicable to, for example, four-stroke engines.

Figure 10:
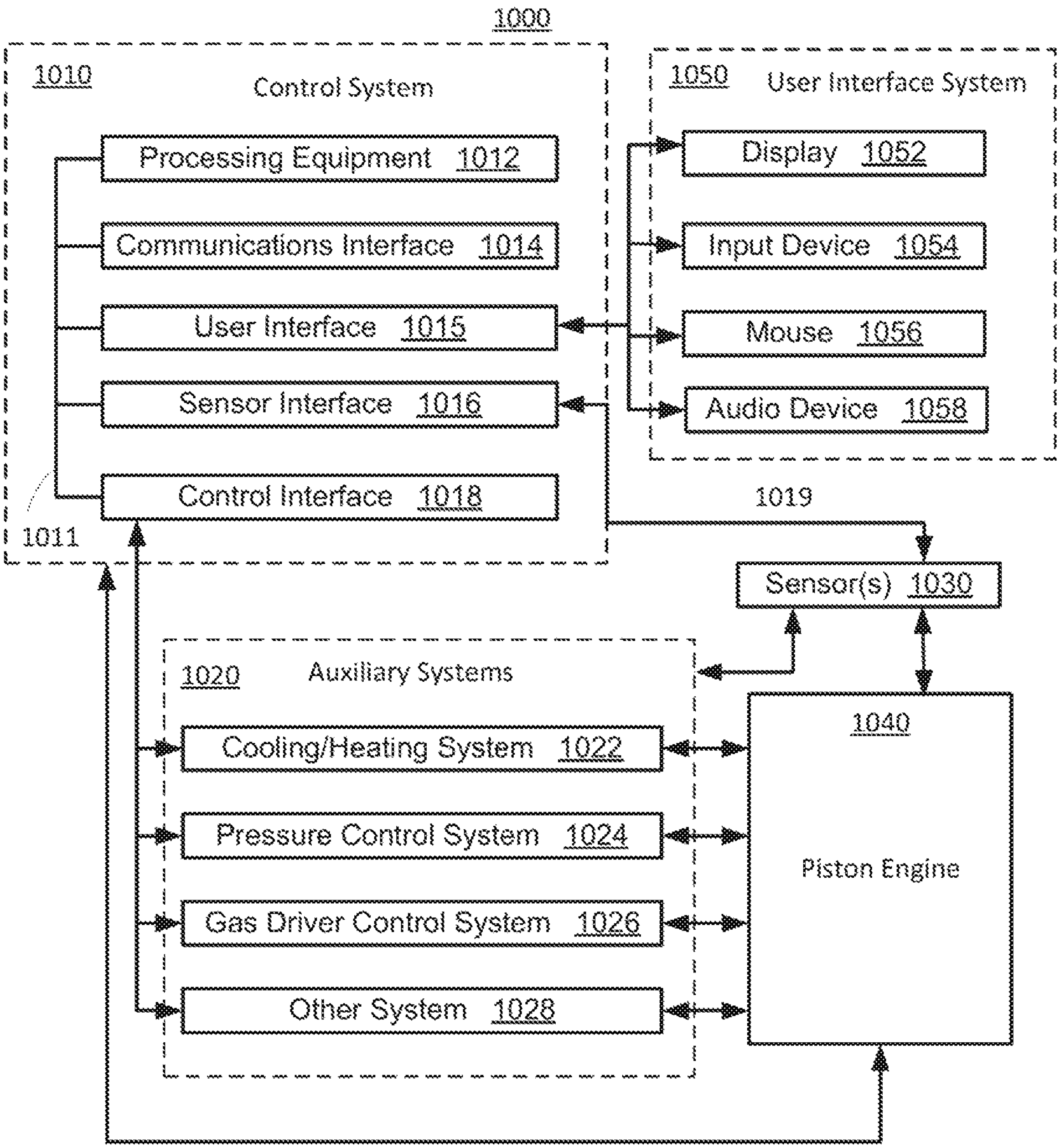
FIG. 10 is a block diagram of an illustrative piston engine system in accordance with some embodiments of the present disclosure.

FIG. 10 is a block diagram of an illustrative piston engine system 1000 having control system 1010 for a piston engine 1040, in accordance with some embodiments of the present disclosure. Piston engine 1040 may be, for example, any suitable free-piston engine as described above with respect to FIGS. 2-7. Control system 1010 may communicate with one or more sensors 1030 coupled to piston engine 1040. Control system 1010 may be configured to communicate with auxiliary systems 1020, which may be used to adjust operating aspects or properties of piston engine 1040. In some embodiments, more than one piston engine may be controlled by control system 1010. For example, control system 1010 may be configured to communicate with auxiliary systems and sensors corresponding to any number of piston engines. In some embodiments, control system 1010 may be configured to interact with a user via user interface system 1050.

Control system 1010 may include processing equipment 1012, communications interface 1014, sensor interface 1016, control interface 1018, any other suitable components or modules, or any combination thereof. Control system 1010 may be implemented at least partially in one or more integrated circuits, ASIC, FPGA, microcontroller, DSP, computers, terminals, control stations, handheld devices, modules, any other suitable devices, or any combination thereof. In some embodiments, the components of control system 1010 may be communicatively coupled via individual communications links or a communications bus 1011, as shown in FIG. 10. Processing equipment 1012 may include any suitable processing circuitry, such as one or more processors (e.g., a central processing unit), cache, random access memory (RAM), read only memory (ROM), any other suitable hardware components or any combination thereof that may be configured (e.g., using software, or hard-wired) to process information regarding piston engine 1040, as received by sensor interface 1016 from sensor(s) 1030. Sensor interface 1016 may include a power supply for supplying power to sensor(s) 1030, a signal conditioner, a signal pre-processor, any other suitable components, or any combination thereof. For example, sensor interface 1016 may include a filter, an amplifier, a sampler, and an analog to digital converter for conditioning and pre-processing signals from sensor(s) 1030. Sensor interface 1016 may communicate with sensor(s) 1030 via communicative coupling 1019, which may be a wired connection (e.g., using IEEE 802.3 ethernet, or universal serial bus interface), wireless coupling (e.g., using IEEE 802.11 "Wi-Fi", or Bluetooth), optical coupling, inductive coupling, any other suitable coupling, or any combination thereof. Control system 1010, and more particularly processing equipment 1012, may be configured to provide control of piston engine 1040 over relevant time scales. For example, a change in one or more temperatures may be controllable in response to one or more detected engine operating characteristics, and the control may be provided on a time scale relevant to operation of the piston engine (e.g., fast enough response to prevent overheating and/or component failure, to adequately provide apex control as described below, to allow for shutdown in the case of a diagnostic event, and/or for adequate load tracking).

Sensor(s) 1030 may include any suitable type of sensor, which may be configured to sense any suitable property or aspect of piston engine 1040. In some embodiments, sensor(s) may include one or more sensors configured to sense an aspect and/or property of a system of auxiliary systems 1020. In some embodiments, sensor(s) 1030 may include a temperature sensor (e.g., a thermocouple, resistance temperature detector, thermistor, or optical temperature sensor) configured to sense the temperature of a component of piston engine 1040, a fluid introduced to or recovered from piston engine 1040, or both. In some embodiments, sensor(s) 1030 may include one or more pressure sensors (e.g., piezoelectric pressure transducers, strain-based pressure transducers, or gas ionization sensors) configured to sense a pressure within a section of piston engine 1040 (e.g., a combustion section, or gas driver section), of a fluid introduced to or recovered from piston engine 1040, or both. In some embodiments, sensor(s) 1030 may include one or more force sensors (e.g., piezoelectric force transducers or strain-based force transducers) configured to sense a force within piston engine 1040 such as a tensile, compressive or shear force (e.g., which may indicate a friction force or other relevant force information, pressure information, or acceleration information). In some embodiments, sensor(s) 1030 may include one or more current and/or voltage sensors (e.g., an ammeter and/or voltmeter coupled to a LEM of piston engine 1040) configured to sense a voltage, current, power output and/or input (e.g., current multiplied by voltage), any other suitable electrical property of piston engine 1040 and/or auxiliary systems 1020, or any combination thereof. In some embodiments, sensor(s) 1030 may include one or more sensors configured to sense the position of the piston assembly and/or any other components of the engine, the speed of the piston assembly and/or any other components of the engine, the acceleration of the piston assembly and/or any other components of the engine, the rate of flow, oxygen or nitrogen oxide emission levels, other emission levels, any other suitable property of piston engine 1040 and/or auxiliary systems 1020, or any combination thereof.

Control interface 1018 may include a wired connection, wireless coupling, optical coupling, inductive coupling, any other suitable coupling, or any combination thereof, for communicating with one or more of auxiliary systems 1020. In some embodiments, control interface 1018 may include a digital to analog converter to provide an analog control signal to any or all of auxiliary systems 1020.

Auxiliary systems 1020 may include a cooling system 1022, a pressure control system 1024, a gas driver control system 1026, and/or any other suitable control system 1028. Cooling/heating system 1022 may include a pump, fluid reservoir, pressure regulator, bypass, radiator, fluid conduits, electric power circuitry (e.g., for electric heaters), any other suitable components, or any combination thereof to provide cooling, heating, or both to piston engine 1040. Pressure control system 1024 may include a pump, compressor, fluid reservoir, pressure regulator, fluid conduits, any other suitable components, or any combination thereof to supply (and optionally receive) a pressure controlled fluid to piston engine 1040. Gas driver control system 1026 may include a compressor, gas reservoir, pressure regulator, fluid conduits, any other suitable components, or any combination thereof to supply (and optionally receive) a driver gas to piston engine 1040. In some embodiments, gas driver control system may include any suitable components to control any of the gas spring components described above with respect to FIGS. 2-7. In some embodiments, other system 1028 may include a valving system such as, for example, a cam-operated system, a solenoid system, or any other electromechanical device or electric machine to supply oxidizer and/or fuel to piston engine 1040. Valving may also be used to regulate exhaust flow out of the engine, such as in an unported engine having, for example, a single piston assembly arrangement or dual piston assembly arrangement. Exhaust valves may be controlled with voice coils (e.g., linear motors) to allow uni-flow scavenging.

User interface 1015 may include a wired connection, wireless coupling, optical coupling, inductive coupling, any other suitable coupling, or any combination thereof, for communicating with one or more of user interface systems 1050. User interface systems 1050 may include display 1052, input device 1054, mouse 1056, audio device 1058, a remote interface accessed via website, mobile application, or other internet service, any other suitable user interface devices, or any combination thereof. In some embodiments, a remote interface may be remote from the engine but in proximity to the site of the engine. In other embodiments, a remote interface may be remote from both the engine and the site of the engine. Display 1052 may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. In some embodiments, display 1052 may include a touch-screen, which may provide tactile interaction with a user by, for example, offering one or more soft commands on a display screen. Display 1052 may display any suitable information regarding piston engine 1040 (e.g., a time series of a property of piston engine 1040), control system 1010, auxiliary systems 1020, user interface system 1050, any other suitable information, or any combination thereof. Input device 1054 may include a QWERTY keyboard, a numeric keypad, any other suitable collection of hard command buttons, or any combination thereof. Mouse 1056 may include any suitable pointing device that may control a cursor or icon on a graphical user interface displayed on a display screen. Mouse 1056 may include a handheld device (e.g., capable of moving in two or three dimensions), a touchpad, any other suitable pointing device, or any combination thereof. Audio device 1058 may include a microphone, a speaker, headphones, any other suitable device for providing and/or receiving audio signals, or any combination thereof. For example, audio device 1058 may include a microphone, and processing equipment 1012 may process audio commands received via user interface 1015 caused by a user speaking into the microphone.

In some embodiments, control system 1010 may be configured to receive one or more user inputs to provide control. For example, in some embodiments, control system 1010 may override control settings based on sensor feedback, and base a control signal to auxiliary system 1020 on one or more user inputs to user interface system 1050. In a further example, a user may input a set-point value for one or more control variables (e.g., temperatures, pressures, flow rates, work inputs/outputs, or other variables) and control system 1010 may execute a control algorithm based on the set-point value.

In some embodiments, operating characteristics (e.g., one or more desired property values of piston engine 1040 or auxiliary systems 1020) may be pre-defined by a manufacturer, user, or both. For example, particular operating characteristics may be stored in memory of processing equipment 1012, and may be accessed to provide one or more control signals. In some embodiments, one or more of the operating characteristics may be changed by a user. Control system 1010 may be used to maintain, adjust, or otherwise manage those operating characteristics. For example, control system 1010 may be used to alter operation based on environmental conditions such as temperature and pressure.

In some embodiments, control system 1010 computes a position-force trajectory for the one or more piston assemblies in a free-piston engine based at least in part on a desired engine performance (e.g., a desired apex position) and a current position of one or more piston assemblies. Based on the calculated position-force trajectory, control system 1010 effects the displacement of the one or more piston assemblies by applying particular forces to the one or more piston assemblies over a specified time or position intervals. The calculation of each position-force trajectory by control system 1010 is computed without regard to a deviation from a previously determined trajectory (position-force, time-position, or any other suitable trajectory). Control system 1010 may calculate a position-force trajectory when a particular trigger is activated (e.g., in response to a particular event), repeatedly over an engine stroke or cycle, after changes to the operating state of the engine, or any combination thereof. In some embodiments, control system 1010 may also calculate a position-force trajectory without regard to the timing of a desired engine performance. In some instances, control system 1010 may calculate a position-force trajectory based on the operating state of the engine. In some embodiments, control system 1010 may estimate a current operating parameter of the engine based on a preceding force that was calculated as part of a previous position-force trajectory or based on a preceding force that was applied to the one or more piston assemblies. In certain instances, control system 1010 may calculate a position-force trajectory using a closed-form solution, a numerically iterative solution, or a combination of both. In embodiments with multiple piston assemblies, control system 1010 may, in addition to calculating a position-force trajectory for each respective piston assembly, also calculate synchronization forces for the multiple piston assemblies and cause certain forces to be applied to the multiple piston assemblies based on the synchronization calculations to synchronize the movements of the multiple piston assemblies as desired. In some embodiments, the control system 1010 may employ a hybrid control strategy that switches between a position-force trajectory control technique and another control technique (e.g., a control technique that relies on the calculation of deviation from a previously determined trajectory) depending on the operating state of the engine.

The following is a discussion of some illustrative embodiments implemented in accordance with the concepts described above. These embodiments generally relate to single- and dual-piston free-piston internal combustion engines with driver sections, such as those illustrated in FIGS. 2-7 and discussed above. In these embodiments, control system 1010 is used to cause displacement of respective piston assemblies based on a desired engine performance. It will be understood that implementations and concepts discussed with reference to these specific embodiments are generally applicable to other embodiments as well. This discussion is provided for purposes of illustration and is not intended to limit the applicability of the disclosed implementations and concepts to only these embodiments.

Figure 11:
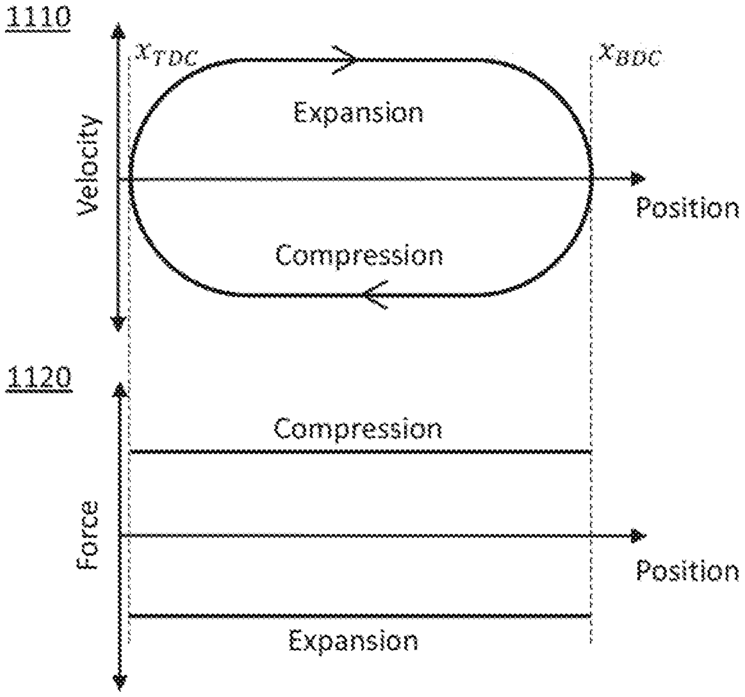
FIG. 11 illustrates an exemplary position-velocity and position-force trajectories of a free-piston engine over a compression and an expansion stroke, in accordance with some embodiments of the present disclosure.

FIG. 11 shows exemplary position-velocity and position-force trajectories (1110 and 1120, respectively) of a piston assembly in a free-piston engine over a compression stroke and an expansion stroke. The force values shown in 1120 correspond to the force values calculated by the control system 1010 and applied to the piston assembly by exerting an electromagnetic force on the piston assembly via a LEM. The profiles illustrated in FIG. 11 are idealized, simplified, or both for purposes of clarity and ease of illustration. It will be understood that actual profiles may be different. Electromagnetic forces are referred to herein as LEM forces, LEM force values, motor forces, motor force values, forces, or force values. With reference to FIG. 11 and the proceeding trajectory figures, the positive direction corresponds to the direction from TDC to BDC (e.g., a positive velocity corresponds to the piston assembly is moving from TDC to BDC and a positive force corresponds to a force being applied in the direction toward BDC). Additionally, with reference to FIG. 11 and the proceeding trajectory figures, the zero position point corresponds to the center line for an opposed-piston free-piston engine (e.g., FIGS. 2-4 and FIG. 7) or the combustion section end (i.e., the head of the combustion section) for a single-piston free-piston engine (e.g., FIG. 5). As shown in FIG. 11, the piston assembly cycles between BDC and TDC (its apices) while the LEM applies a force in the opposite direction of the motion of the piston assemblies, thereby producing net electrical energy output over both strokes. Producing net electrical energy output over both strokes requires that a driver section is sized such that it can store enough energy from an expansion stroke to provide more than enough energy required to perform the subsequent compression stroke. While this paradigm is generally assumed in the following discussion, it will be understood that the control techniques disclosed herein can be applied to free-piston engines in which the driver section is sized such that net electrical energy input is required during the compression stroke and to free-piston engines in which there is no driver section and all of the energy required to perform a compression stroke is provided by a LEM. The single motor force values for each stroke shown in 1120 are an idealized representation of how a free-piston engine could operate. The following is a discussion of specific embodiments in which control system 1010 may be used to control the displacement of a piston assembly in a free-piston engine to achieve a desired engine performance.

Figure 12:
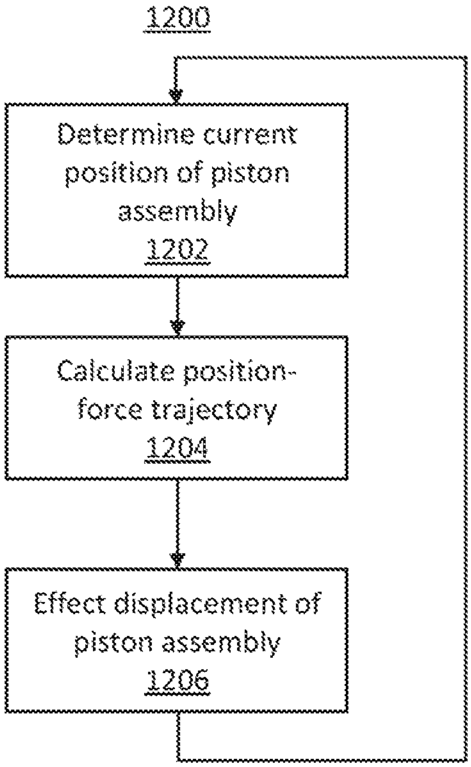
FIG. 12 shows a flow diagram of illustrative steps for causing movement of a free-piston assembly along a propagation path in accordance with some embodiments of the present disclosure.

FIG. 12 shows a flow chart 1200 of illustrative steps for control system 1010 to control the displacement of the one or more piston assemblies along a propagation path in a free-piston engine in accordance with some embodiments of the present disclosure. As illustrated, control system 1010 first determines, at step 1202, a current position of the one or more piston assemblies in a free-piston engine. Next, control system 1010 calculates, at step 1204, a position-force trajectory based on a desired engine performance and the current position of the one or more piston assemblies. Lastly, control system 1010 effects the displacement of the one or more piston assemblies by applying the one or more force values calculated in step 1204 to the one or more piston assemblies. The sequential steps 1202, 1204, and 1206 are repeated until control system 1010 sends a command to cease. The command to cease may be sent for any suitable reason, including, for example, control system 1010 having determined to switch to a different control technique, to turn off the engine, that a mechanical or electronic safety switch tripped, for any other suitable reason, or for any combination thereof. The sequential steps 1202, 1204, and 1206 can repeat based on the activation of a particular trigger or repeat throughout an engine stroke or cycle. For example, sequential steps 1202, 1204, and 1206 can repeat in response to a particular event, at a particular threshold crossing, any other suitable trigger, or any combination thereof. In another example, sequential steps 1202, 1204, and 1206 can repeat at particular time intervals (e.g., 1 kHz, 10 kHz, etc.) or at particular discrete position intervals (e.g., every 1 millimeter, every 1 micron, etc.). This particular control technique, as illustrated by flow chart 1200, is referred to herein as a position-force trajectory control technique.

Control system 1010 determines a current position of the one or more piston assemblies at step 1202 using any suitable sensor(s) 1030. Suitable sensors 1030 for determining position of the one or more piston assemblies include magnetic encoders, optical encoders, optical grating encoders, laser-based encoders, any other suitable sensors for determining position, or any combination thereof. The current position can be any position between BDC and TDC, inclusive. While, in the case of a linear free-piston engine, a current position of the one or more piston assemblies can be represented as a single dimension along a single axis of propagation per piston assembly, it will be understood that the teachings of the present disclosure can be applied to a free-piston engine in which a piston assembly is able to move in more than one dimension and in which a current position can be represented multi-dimensionally.

At step 1206, control system 1010 sends one or more commands to the free-piston engine and/or its auxiliaries to effect the displacement of the one or more piston assemblies by applying the one or more force values calculated in step 1204 to the one or more piston assemblies. The forces may be applied to the one or more piston assemblies by, for example, exerting an electromagnetic force onto the one or more piston assembly via a LEM. The following discussion is directed toward applying the forces through a LEM, but it will be understood that the application of force to the one or more piston assemblies could be applied through other techniques, such as, for example, by adjusting properties of the driver section (e.g., adjusting the spring stiffness or spring constant of the driver section). In some embodiments, application of motor force can be implemented using techniques as described in commonly assigned U.S. Pat. No. 8,624,542, issued on Jan. 7, 2014, which hereby incorporated by reference herein in its entirety.

The force values effected on the one or more piston assemblies in step 1206 are based on the position-force trajectory previously calculated in step 1204. It will be understood that reference to a force being "effected" on a piston assembly refers to control system 1010 causing the mechanism that imparts a force onto the piston assembly to impart the force as indicated by control system 1010 (including a positive force, a negative force, or a force of zero). At step 1204, control system calculates a position-force trajectory for the one or more piston assemblies based at least in part on a desired engine performance (e.g., a desired apex position) and the current piston of the one or more piston assemblies determined in step 1202. The calculation of a position-force trajectory by control system 1010 is computed without regard to a deviation from a previously determined trajectory (position-force, time-position, or any other suitable trajectory). For example, instead of using a trajectory that was calculated at the beginning of a stroke (i.e., a previously calculated trajectory) and then compensating for deviations from this previously calculated trajectory during the course of propagation, an entirely new trajectory is calculated every time sequential steps 1202, 1204, and 1206 are repeated. This type of resolution allows for changes in and to the operating state of the free-piston engine to be accounted for with each new position-force trajectory calculation. Control system 1010 may calculate a position-force trajectory based also on a current or past operating state of the engine. For example, control system 1010 may calculate a position-force trajectory based on any suitable properties of the one or more piston assemblies (e.g., velocities, accelerations, dimensions, mechanical properties), any suitable properties of the combustion section gas (e.g., pressure, temperature, density, specific heat, dimensions), any suitable properties of the driver section (e.g., gas properties if a gas spring, mechanical properties if a mechanical spring, dimensions), any suitable properties of the LEM (e.g., motor force constants, motor force limits, motor current limits, motor resistance), any suitable properties of the engine performance (e.g., efficiency, power output, air flow, fuel flow, exhaust flow, fuel composition, exhaust composition, temperatures, pressures), any other suitable calculated, measured, or estimated values or indicators of the operating characteristics, performance, parameters, and environment of the engine, or any combination thereof.

Figure 13:
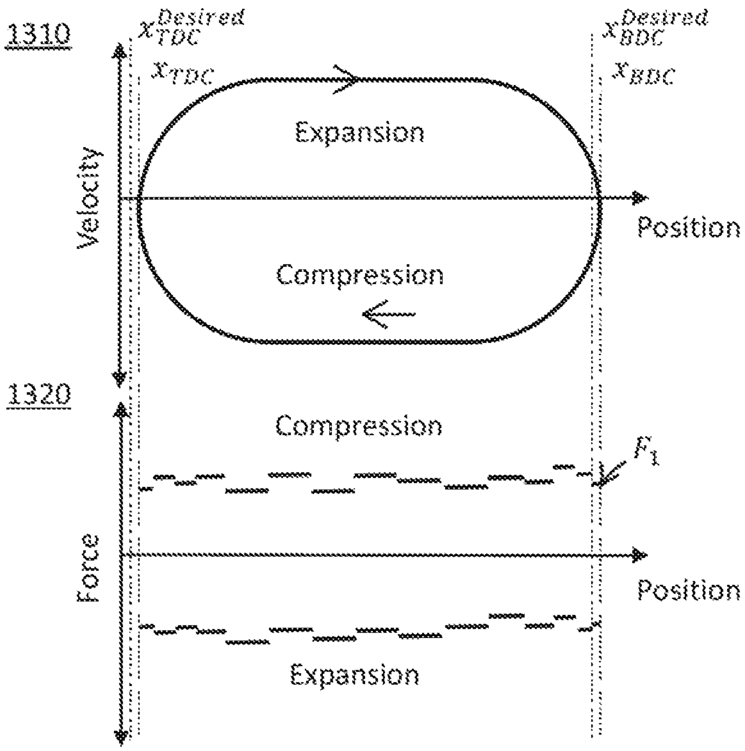
FIG. 13 illustrates other exemplary position-velocity and position-force trajectories of a free-piston engine over a compression and an expansion stroke, in accordance with some embodiments of the present disclosure.

FIG. 13 shows a position-velocity trajectory and position-force trajectory (1310 and 1320, respectively) illustrating one embodiment of the position-force trajectory control technique disclosed herein. In this embodiment, the desired engine conditions (on which the calculation of position-force trajectories are based) are the desired apex positions of the piston assembly ($x_{TDC}^{Desired}$ and $x_{BDC}^{Desired}$). That is, the control objective is to effect the displacement of the piston assembly such that it has zero velocity at the desired TDC and BDC positions. The actual apex positions of the piston assembly ($x_{TDC}$ and $x_{BDC}$) are shown, for illustrative purposes, in FIG. 13 as being different than the desired positions of the piston assembly. It will be understood, however, that the difference between the desired and actual apex positions of a piston assembly can be zero, positive, negative, or any combination thereof, and can vary depending on the specific implementation of a position-force trajectory control technique. In this embodiment, a new position-force trajectory is calculated at a fixed time interval as illustrated by the force values shown in the position-force trajectory plot 1320 (i.e., at higher velocities the force values are applied to the piston assembly over a longer distance, and at lower velocities the force values are applied to the piston assembly over a shorter distance). That is, the sequential steps 1202, 1204, and 1206 in flow chart 1200 in FIG. 12 are repeated at a fixed time interval (e.g., 1, 5, 100 kHz). All of the force values in the position-force trajectory plot 1320 are shown, for illustrative purposes, in FIG. 13 as being in the opposite direction of the motion of the piston assemblies (i.e., the LEM is always converting kinetic energy of the piston assembly into electrical energy). It will be understood, however, that each force value can be any suitable force value, including a positive force value (i.e., encouraging displacement of a piston assembly during an expansion stroke and discouraging displacement of a piston assembly during a compression stroke), a negative force value (i.e., encouraging displacement of a piston assembly during an compression stroke and discouraging displacement of a piston assembly during a expansion stroke), or a zero or neutral force value (i.e., allowing the piston assembly displacement to continue using its current momentum without applying any force).

In this embodiment, referring to FIG. 13, the first position-force trajectory of a compression stroke is calculated at BDC, as illustrated by the force value $F_I$ in the position-force trajectory plot 1320. Control system 1010 calculates this first force value (in the position-force trajectory step 1204 of flow chart 1200 in FIG. 12) based at least in part on the current position of the piston assembly (determined in step 1202) and the desired apex position of the piston assembly ($x_{TDC}^{Desired}$) and then applies this force to the piston assembly via a LEM of the engine (in step 1206) until a new position of the piston assembly is determined and new position-force trajectory is calculated, which occurs, in this embodiment, based on a prescribed time interval. These sequential steps are repeated until the piston assembly apices at TDC ($x_{TDC}$), at which point control system 1010 then repeats the sequential steps based on a new desired apex position at BDC ($x_{BDC}^{Desired}$). The desired apex positions may remain constant across cycles, remain constant within a stroke, change across cycles, change within a stroke, or any combination thereof.

In some embodiments, control system 1010 may rely the First Law of Thermodynamics (i.e., conservation of energy) to calculate a position-force trajectory at each step 1204. For example, for a single-piston free-piston engine, a position-force trajectory can be calculated by recognizing that, over an idealized stroke of the engine (i.e., no losses from heat transfer, gas blow-by, or friction), the work from/to the LEM, the work from/to the combustion section gas, the kinetic energy of the piston assembly, and the work from/to the driver section must sum to zero. This can be captured, for example, in equation 1, where $W_{LEM}$ is the work from/to the LEM, $W_c$ is the work from/to the combustion section gas, $KE_p$ is the kinetic energy of the piston assembly, and $W_d$ is the work from/to the driver section.

$$W_{LEM}+W_c+KE_p+W_d=0 \quad (1)$$

The work from/to the LEM can be calculated by integrating the motor force ($F_{LEM}$) over the change in position (x) of the piston assembly from a current position of the piston assembly ($x^c$) to a desired target position of the piston assembly ($x^d$) (e.g., a desired apex position). Since each force value is applied to the piston assembly by the LEM until a new force value is calculated and then subsequently applied, the motor force can be modeled as being constant between a current position of the piston assembly and a desired target position of the piston assembly. This simplifies the calculation of the work from/to the LEM to just the motor force multiplied by the difference between the desired target position and the current position, as shown in equation 4, where $x^d$ can be either a TDC or BDC desired target position.

$$W_{LEM}=\int_{x^c}^{x^d}F_{LEM}dx=F_{LEM}\int_{x^c}^{x^d}dx=F_{LEM}(x^d-x^c) \quad (4)$$

The work from/to the combustion section gas can be calculated by integrating the pressure of combustion section gas over the change in volume of the combustion section from a the combustion section volume at a current position of the piston assembly ($V_c^c$) to the combustion section volume at a desired target position of the piston assembly ($V_c^d$). In this example, for a desired TDC and BDC target positions, the work from/to the combustion section can be calculated according to equation 2, where $V_c$ is the volume of the combustion section, $p_c$ is the combustion section gas pressure as a function of the volume of the combustion section, and $V_c^d$ can be based on either a TDC or BDC desired target position.

$$W_c=-\int_{V_c^c}^{V_c^d}p_c dV_c \quad (2)$$

The kinetic energy of the piston assembly is equal to the one half the product of the mass of the piston assembly ($m_p$) and the square of the current velocity of the piston assembly ($\dot{x}^c$), as shown in equation 3.

$$KE_p=\tfrac{1}{2}m_p\dot{x}^{c^2} \quad (3)$$

The work from/to the driver section depends on the type of driver section. If the driver section comprises a gas spring, then the work from/to the gas spring can be calculated similarly to the calculation of the work from/to the combustion section gas. If the driver, comprises a mechanical spring, then the work from/to the mechanical spring may be calculated based on Hooke's Law. If the driver section comprises both a gas spring and a mechanical spring, then the work from/to the driver section can be calculated using a combination of the two models. In this example, for illustrative purpose, the driver section comprises a gas spring, and the work from/to the gas spring (driver section) can be calculated using equation 5, where $W_s$ is the work from/to the gas spring, $V_s$ is the volume of the gas spring, $p_s$ is the gas spring gas pressure as a function of the volume of the gas spring, $V_s^c$ is the volume of the gas spring at a current position of the piston assembly, and $V_s^d$ is the volume of the gas spring at the desired target position of the piston assembly which can be based on either a TDC or BDC desired target position.

$$W_d=W_s=-\int_{V_s^c}^{V_s^d}p_s dV_s \quad (5)$$

Having models for calculating the work and energy values in equation 1, a motor force value of a position-force trajectory can be calculated by substituting equations 2-5 into equation 1, as shown in equation 6.

$$F_{LEM}=\left(\int_{V_c^c}^{V_c^d}p_c dV_c+\int_{V_s^c}^{V_s^d}p_s dV_s-\tfrac{1}{2}m_p\dot{x}^{c^2}\right)/(x^d-x^c) \quad (6)$$

As can be seen in equation 6, this model for calculating a position-force trajectory has a shrinking horizon as the current position of the piston assembly approaches the desired target position of the piston assembly (i.e., the denominator in equation 6 approaches zero). Practical limits can be set by or input to control system 1010 on the minimum horizon (i.e., the minimum difference between the current position of the piston assembly and the desired target position of the piston assembly) to avoid division by zero, which may, in some embodiments, limit the effective authority of control system 1010 near a desired target position. If the cross-sectional areas of interface between the piston assembly and the combustion section gas and the gas spring gas can be modeled as being constant, the combustion section gas work and the gas spring gas work in equation 6 can be calculated based on the change in piston assembly position from a current position to a desired target position since the volume of the respective sections is an affine function of the position of the piston assembly. This substitution is shown in equation 7, where $p_c(x)$ is the combustion section gas pressure as a function of the position of the piston assembly, $p_s(x)$ is the gas spring gas pressure as a function of the position of the piston assembly, $A_c$ is the cross-sectional area of interface between the piston assembly and the combustion section gas, and $A_s$ is the cross-sectional area of interface between the piston assembly and the gas spring gas.

$$F_{LEM} = \left(A_c \int_{x^c}^{x^d} p_c(x)dx - A_s \int_{x^c}^{x^d} p_s(x)dx - \frac{1}{2} m_p \dot{x}^{c2}\right) \Big/ \left(x^d - x^c\right) \tag{7}$$

As shown in equations 6 and 7, each position-force trajectory is calculated based at least in part on the current position of the piston assembly and the desired apex position (i.e., desired target position) of the piston assembly, without regard to a deviation from a previously determined trajectory, without regard to the time in which a new position-force trajectory will be calculated, and without regard to the time in which the piston assembly reaches the desired apex position. Repeatedly calculating a position-force trajectory using this model over a stroke of an engine cycle allows for changes in and to the operating state of the free-piston engine (rapid or slow, intended or unintended) to be accounted for in each new position-force trajectory calculation, thereby providing a control technique for a free-piston engine that is capable of rejecting disturbances in the operating state of the engine. The control technique is capable of rejecting disturbances due to, for example, combustion variability, combustion misfires, changes in fuel energy content, changes in gas temperatures or pressures, loss of LEM phases, changes in or to the driver section spring constant, or any other suitable disturbance, or any combination thereof. Equations 6 and 7 were derived assuming that there were no energy losses within the engine, such as, for example, from heat transfer, gas blow-by, or friction. However, it will be understood that energy losses can be included in the position-force trajectory control technique disclosed herein. For example, heat transfer losses in a gaseous section of an engine can be modeled as a function of gas temperature (which can be modeled as a function of position or volume), heat transfer losses in a LEM can be modeled as a function of electrical current and resistance, gas blow-by losses in a gaseous section of an engine can be modeled as a function of gas pressure (which can be modeled as a function of position or volume), and friction losses can be modeled as a function of contact forces, material properties, position, and/or velocity.

Solving equation 6 requires integration of pressure over a change in volume for, in this example, both the combustion section gas and gas spring gas. These integrals can be computed using a numerically iterative solution (e.g., an ordinary differential equation solver) based on thermodynamic property models, heat transfer models, gas blow-by models, friction models, or any other suitable model, or any combination thereof. These integrals can also be computed using a closed-form solution based on thermodynamic models that may incorporate effects from heat transfer, gas blow-by, friction, and other losses in the system. Using a closed-form solution to calculate a position-force trajectory saves computation time compared to a numerically iterative solution. This can allow the control system 1010 to calculate a new position-force trajectory in shorter time intervals (i.e., at a faster frequency), which can better account for disturbances in the operating state of the engine. For example, the compression and expansion of the gases in the combustion section and gas spring can be modeled as being reversible. The reversible work for the compression and expansion of a gas can be calculated using equation 8, where $p_1$ is the pressure of the gas at state 1, $V_1$ is the volume of the gas at state 1, $V_2$ is the volume of the gas at state 2, and k is the ratio of specific heats.

$$W_{rev,1\to 2} = \int_{V_1}^{V_2} p dV = \frac{p_1 V_1}{k-1}\left(\left(\frac{V_1}{V_2}\right)^{k-1} - 1\right) \tag{8}$$

Modeling the compression and expansion of the combustion section gas and gas spring gas as being isentropic, can yield a closed-form solution for calculating a position-force trajectory, as shown in equation 9, where $k_c$ is the ratio of specific heats for the combustion section gas and $k_s$ is the ratio of specific heats for the gas spring gas.

$$F_{LEM} = \left(\frac{p_c^c V_c^c}{k_c - 1}\left(\left(\frac{V_c^c}{V_c^d}\right)^{k_c-1} - 1\right) + \frac{p_s^c V_s^c}{k_s - 1}\left(\left(\frac{V_s^c}{V_s^d}\right)^{k_s-1} - 1\right) - \frac{1}{2} m_p \dot{x}^{c2}\right) \Big/ \left(x^d - x^c\right) \tag{9}$$

As shown in equation 9, different ratios of specific heats can be used for the combustion section gas and the gas spring gas (e.g., to account for differences in composition). Different ratios of specific heats can also be used for a compression stroke and an expansion stroke (e.g., to account for the changes in composition of the combustion section gas), for specific position intervals within a stroke (e.g., to account for changes during engine breathing while ports are exposed), for each calculation of a position-force trajectory (e.g., to account for changes in gas temperature), for any other suitable purpose or reason, or any combination thereof. A closed-form solution can also be derived by modeling the gas compression and expansion as being a polytropic process, as shown in equation 10, where $n_c$ is the polytropic exponent for the combustion section gas and $n_s$ is the polytropic exponent for the gas spring gas.

$$F_{LEM} = \left(\frac{p_c^c V_c^c}{n_c - 1}\left(\left(\frac{V_c^c}{V_c^d}\right)^{n_c-1} - 1\right) + \frac{p_s^c V_s^c}{n_s - 1}\left(\left(\frac{V_s^c}{V_s^d}\right)^{n_s-1} - 1\right) - \frac{1}{2} m_p \dot{x}^{c2}\right) \Big/ \left(x^d - x^c\right) \tag{10}$$

Modeling the compression and expansion of gases as being a polytropic process allows for the effects of heat transfer, gas blow-by, friction, other losses, or any combination thereof, to be accounted for while maintaining a closed-form solution for calculating a position-force trajectory. The polytropic exponents for the combustion section gas and the gas spring gas can be based on modeled or empirically determined engine performance data or information. Different polytropic exponents can be used for a compression stroke and an expansion stroke, for specific position intervals within a stroke, for each calculation of a position-force trajectory, for any other suitable purpose or reason, or for any combination thereof.

In order for control system 1010 to solve equations 9 or 10, the pressure of the gases in the combustion section and gas spring must be measured or estimated, or both, at each current position of the piston assembly. The pressure of the gases at a current position of the piston assembly can be measured using any suitable sensor(s) 1030 such as piezo-electric pressure transducers, strain-based pressure transducers, gas ionization sensors, any other suitable pressure sensor, or any combination thereof. The pressure of the gases at a current position of the piston assembly can also be estimated. In general, relying on estimates of pressure (as opposed to measurements of pressure) can save cost and lead to higher reliability engine operation because it avoids the need for expensive and often unreliable pressure sensors. For example, the compression and expansion of the gases can be modeled as being isentropic or polytropic using equations 11 or 12, respectively, where $\hat{p}^c$ is the estimated gas pressure at a current position of the piston assembly, $p^P$ is the measured or estimated gas pressure at a previously determined position of the piston assembly, and $V^P$ is the measured or estimated volume of the gas at the same previously determined position of the piston assembly. Equations 11 and 12 are applicable to estimating the current gas pressures in any section of an engine, including a combustion section and driver section.

$$\hat{p}^c = p^p\left(\frac{V^p}{V^c}\right)^k \tag{11}$$

$$\hat{p}^c = p^p\left(\frac{V^p}{V^c}\right)^n \tag{12}$$

In another example, for a single-piston free-piston engine with a gas spring driver section, a force balance model can be applied to the translator to estimate a current gas pressure of the combustion section based on a measured or estimated current gas pressure of the gas spring, a previously applied/calculated motor force value, the mass of the piston assembly, and a current measured or estimated acceleration of the piston assembly. This force balance model is shown in equation 13, where $\hat{p}_c^{\,c}$ is the estimated gas pressure in the combustion section at the current position of the piston assembly, $\ddot{x}^c$ is a current acceleration of the piston assembly, $F_{LEM}^{\ P}$ is a previously applied/calculated motor force, and $p_s^{\,c}$ is the measured or estimated current gas pressure in the gas spring.

$$\hat{p}_c^{\,c}=(m_p\ddot{x}^c-F_{LEM}^{\ P}+p_s^{\,c}A_s)/A_c \tag{13}$$

A force balance model may also be used to estimate a previous gas pressure of the combustion section based on previously measured or estimated other values, which can then be used to calculate a current gas pressure of the combustion section through, for example, equations 11 or 12. This force balance model is equation 14, where $\hat{p}_c^{\,P}$ is the estimated gas pressure of a combustion section at a previous position of the piston assembly, $\ddot{x}^P$ is the previously determined acceleration of the piston assembly, and $p_s^{\,P}$ is the previously determined gas pressure of the gas spring.

$$\hat{p}_c^{\,P}=(m_p\ddot{x}^P-F_{LEM}^{\ P}+p_s^{\,P}A_s)/A_c \tag{14}$$

It will be understood that force balance models (similar to those used to derive equations 13 and 14) can also be used to estimate the current or previous gas pressures in other section of an engine, such as, for example, a driver section.

In some embodiments, control system 1010 may estimate a current gas pressure in a section of a free-piston engine by integrating energy balances over a stroke of an engine cycle from a fixed previous position to a current position of a free-piston assembly, where a fixed previous position may be, for example, an apex position, a port opening or closing position, a combustion event, any other suitable position, or any combination thereof. For example, for a single-piston free-piston engine with a gas spring driver section, a current gas pressure can be estimated by using equation 15, which models the energy balance of a free-piston assembly from a fixed previous position to a current position, where $W_{LEM}^{\ o\rightarrow c}$ is the work from/to the LEM from the fixed previous position to the current position, $W_c^{\ o\rightarrow c}$ is the work from/to the combustion section gas from the fixed previous position to the current position, and $W_s^{\ o\rightarrow c}$ is the work from/to the gas spring section gas from the fixed previous position to the current position.

$$W_c^{\ o\rightarrow c}+W_s^{\ o\rightarrow c}+W_{LEM}^{\ o\rightarrow c}+KE_p=0 \tag{15}$$

The compression and expansion of the gases in the combustion section and gas spring section can be modeled as being reversible and/or polytropic to yield closed-form solutions for the work from/to the respective sections. Modeling the compression and expansion of the gases in the combustion section and gas spring section as being polytropic, for this example, the work from/to the combustion section and from/to the gas spring section from a fixed previous position and current position can be calculated using equations 16 and 17, respectively, where $p_c^{\,o}$ is the measured or estimated combustion section gas pressure at the fixed previous position, $V_c^{\,o}$ is the combustion section volume at the fixed previous position, $p_s^{\,o}$ is the measured or estimated gas spring section gas pressure at the fixed previous position, and $V_s^{\,o}$ is the gas spring section volume at the fixed previous position.

$$W_c^{o\rightarrow c} = \frac{p_c^o V_c^o}{n_c - 1}\left(\left(\frac{V_c^o}{V_c^c}\right)^{n_c-1} - 1\right) = -\frac{p_c^c V_c^c}{n_c - 1}\left(\left(\frac{V_c^c}{V_c^o}\right)^{n_c-1} - 1\right) \tag{16}$$

$$W_s^{o\rightarrow c} = \frac{p_s^o V_s^o}{n_s - 1}\left(\left(\frac{V_s^o}{V_s^c}\right)^{n_s-1} - 1\right) = -\frac{p_s^c V_s^c}{n_s - 1}\left(\left(\frac{V_s^c}{V_s^o}\right)^{n_s-1} - 1\right) \tag{17}$$

The work from/to the LEM can be calculated using equation 18, which updates the amount of work from/to the LEM with each calculation step, where $x^{ip}$ is the position of the piston assembly at the immediately preceding calculation step, $F_{LEM}^{\ ip}$ is the LEM force determined at the immediately preceding calculation step (and then applied to the piston assembly from its position at the immediately preceding calculation step to its current position), and $W_{LEM}^{\ o\rightarrow ip}$ is the amount of work from/to the LEM from the fixed previous position to the position of the piston assembly at the immediately preceding calculation step.

$$W_{LEM}^{\ o\rightarrow c}=F_{LEM}^{\ ip}(x^c-x^{ip})+W_{LEM}^{\ o\rightarrow ip} \tag{18}$$

The kinetic energy of the piston assembly at the current position can calculated using equation 3. Equations 16-18 and 3 can be substituted into equation 15 to estimate a current gas pressure in the combustion section or gas spring section using a closed-form solution. For example, equation 19 shows a closed-form solution for estimating a current pressure of the combustion section gas.

$$\hat{p}_c^c = \frac{\frac{p_s^o V_s^o}{n_s - 1}\left(\left(\frac{V_s^o}{V_s^c}\right)^{n_s-1} - 1\right) + \left(F_{LEM}^{ip}\left(x^c - x^{ip}\right) + W_{LEM}^{o\rightarrow ip}\right) + \frac{1}{2}m_p \dot{x}^{c^2}}{\frac{V_c^c}{n_c - 1}\left(\left(\frac{V_c^c}{V_c^o}\right)^{n_c-1} - 1\right)} \tag{19}$$

Equations 6, 7, 9, and 10, or any other suitable First Law-based analysis used to derive similar equations (e.g., to include losses within the engine), may also be used, separately or in combination, to estimate a current or previous gas pressure in a section of a free-piston engine using similar techniques as those used to derive equations 11-14 and 19 (i.e., through the use of current and previously determined pressures, forces, volumes, positions, velocities, and accelerations). Additionally, equations 11-14 and 19 may be used in combination with each other and/or with other suitable estimation models to estimate a current or previous gas pressure in a section a free-piston engine using similar techniques as those used to derive equations 11-14 and 19 (i.e., through the use of current and previously determined pressures, forces, volumes, positions, velocities, and accelerations).

Using previously calculated values (e.g., force, acceleration, pressure, velocity, position) to estimate a current value (e.g., a current gas pressure) may require the use of a smoothing filter such as an infinite impulse response (IIR) filter or finite impulse response (FIR) filter with suitable coefficients to the values of interest, or a dynamic estimator such as a Luenberger observer or Kalman filter. The pressure of gases at a current or previous position of the piston assembly can be estimated using thermodynamic relation models (e.g., equations 11 or 12), force balance models (e.g., equations 13 or 14), or First Law analysis (e.g., equations 6, 7, 9, 10, or 19), or any combination thereof. For example, the pressure of the gases at a current or previous position of the piston assembly can be estimated using two models, with one of the models being used as a primary estimate and the other model being used to improve the primary estimate using an estimation technique, such as an Kalman filter, Luenberger observer, or model-predictive estimation. In another example, the pressure of the gases at a current or previous position of the piston assembly can be estimated based on a minimization of error between the estimates from any two models. This minimization can weight the two models and include other costs such as, for example, acceleration estimates given several position measurements, deviation from previous pressure measurements or estimates, deviation from pressure measurements or estimates from prior cycles or strokes, computation time, information on noise or disturbance statistics, any other suitable cost, or any combination thereof. In some embodiments, estimations of the gas pressures at a current or previous position of the piston assembly can be improved upon by measurements of pressure from any otherwise unsuitable sensor, which may provide inadequate, noisy, or slow measurements.

When the absolute velocity of a piston assembly is low and its absolute acceleration is high, the efficiency of a LEM may be low and the ability of a LEM to effect the displacement of the piston assembly may be limited. In order to avoid a LEM applying forces to the piston assembly when its efficiency is low and control authority is limited, in some embodiments, control system 1010 may reduce or eliminate the magnitude of force applied to a piston assembly based on specified operating parameters of a free-piston engine. Specified operating parameters may include position, velocity, or acceleration of a piston assembly, temperature of the stator or translator of the LEM, gas pressure in a section of the engine, any other suitable parameter, or any combination thereof. For example, control system 1010 may cut-off the ability of the LEM to apply forces to a piston assembly based on the position of the piston assembly as shown in FIG. 14, which shows position-velocity trajectory 1410 and position-force trajectory 1420. In this example, control system 1010 calculates a position-force trajectory in accordance with the present disclosure, but when the position of the piston assembly is outside of the cut-off positions, control system 1010 determines to not apply the force values calculated in the position-force trajectory calculation step 1204 to the piston assembly. In some embodiments, control system 1010 may determine to apply a different amount of force to a piston assembly than the force values calculated in the position-force trajectory calculation step 1204 based on specified operating conditions of a free-piston engine. For example, control system 1010 may apply a force-reduction function to the force values calculated in the position-force trajectory calculation step 1204 based on a position of the piston assembly (e.g., outside of the cut-off positions) in order to avoid abrupt changes in the operating state of the engine. In some embodiments, control system 1010 may determine to both not calculate a position-force trajectory and not apply a force to a piston assembly based on specified operating conditions of a free-piston engine.

While the various models for calculating a position-force trajectory and estimating gas pressure (i.e., equations 1-19) have been directed towards a single-piston free-piston engine, it will be understood that the same models can be extended and applied to free-piston engines with multiple piston assemblies, such as, but not limited to, opposed-piston free-piston engines with respective driver sections, respective LEMs, and a shared combustion section (e.g., as illustrated in FIGS. 2-4 and FIG. 7). For example, the same First Law analysis used to derive equation 1 can be applied to each piston assembly of an opposed-piston free-piston engine with respective driver sections, respective LEMs, and a shared combustion section. This yields energy balance equations 20a and 20b, where $W_{LEM,1}$ and $W_{LEM,2}$ is the work from/to the two LEMs, $W_c$ is the work from/to the combustion section gas, $KE_{p,1}$ and $KE_{p,2}$ is the kinetic energy of the two piston assemblies, and $W_{d,1}$ and $W_{d,2}$ is the work from/to the two driver sections. Equations 20a and 20b can be used by control system 1010 to calculated a position-force trajectory for each respective piston assembly using the same or similar models as those used to derive equations 6, 7, 9, and 10.

$$W_{LEM,1}+W_c+KE_{p,1}+W_{d,1}=0 \tag{20a}$$

$$W_{LEM,2}+W_c+KE_{p,2}+W_{d,2}=0 \tag{20b}$$

In similar manner in which equation 1 was extended to a free-piston engine with multiple piston assemblies (e.g., equations 20a and 20b), it will be readily apparent that the same force balance models used to derive equations 13 and 14, and the same First Law analysis used to derive equation 15 can be extended to free-piston engines with multiple piston assemblies for estimating gas pressure in a section of the engine.

A consideration that arises in the control of free-piston engines with opposed piston assemblies, is the synchronization of the piston assemblies. In some opposed-piston free-piston engines, it can be desired that the apices (at both TDC and BDC) of the two piston assemblies be at least substantially synchronized in order to maintain system stability. In other opposed-piston free-piston engines, some level of non-synchronization can be desired for engine performance purposes, such as, for example, engine breathing, gas exchange, or any other suitable engine operating condition. In some embodiments of an opposed-piston free-piston engine, control system 1010 may regulate a difference between the positions of the respective piston assembly. As used herein, the term "regulate" refers to controlling to a reference, such as, for example, zero. Control system 1010 may employ any suitable control technique for regulation, such as proportional-integral-derivative (PID) control, optimal control, robust control, linear-quadratic regulator control, model-predictive control, adaptive control, any other suitable technique, or any combination thereof. In some embodiments, control system 1010 may use PID control to regulate and synchronize the positions of piston assemblies. For example, control system 1010 may use PID control to determine control inputs (e.g., forces values to be applied to the piston assemblies by respective LEMs) to regulate a difference in position between the piston assemblies relative to their center of motion. Opposite forces may be added to each piston assembly to synchronize each substantially equally and minimize the disturbance on apex positions. This may be done continuously to substantially balance net forces and, therefore, maintain sufficient synchronization. In some embodiments, control system 1010 may use a specified Poincare map at the zero-velocity positions of the piston assemblies (i.e., at the respective apices). For example, control system 1010 can split a stroke into two halves and apply additional motor force in one direction during the first half of the stroke and then apply additional motor force in the opposite direction during the second half of the stroke. Control system 1010 can determine prior to an expansion stroke that a first piston assembly is going to be late to BDC (e.g., using any suitable expected phasing of the two piston assemblies, based on timing of a previous stroke, based on any other suitable technique, or any combination thereof), and apply additional motor force to this first piston assembly during the first half of the expansion stroke in the direction of motion (i.e., encouraging displacement) and then apply additional motor force to this first piston assembly during the second half of the expansion stroke in the opposite direction of motion during (i.e., discouraging displacement). Conversely for the second piston assembly, control system 1010 can apply additional motor force to this second piston assembly in the opposite direction of motion during the first half of the expansion stroke (i.e., discouraging displacement) and then apply additional motor force to this second piston assembly in the direction of motion during the second half of the expansion stroke (i.e., encouraging displacement). In some embodiments, control system 1010 may determine synchronization forces based on a desired timing of a desired engine performance. For example, control system 1010 may determine synchronization forces to be applied to one or both piston assemblies such that the apices of the respective piston assemblies occur within a sufficiently small time difference.

In some embodiments, control system 1010 may use a repetitive adaptive control technique. Repetitive adaptive control can be advantageous when the operating state, condition, performance, and/or parameters of a free-piston engine are relatively steady and the cycle-to-cycle variation is limited. In some embodiments, control system 1010 may use a repetitive adaptive control technique that determines a position-force trajectory at each step 1204 for a current engine cycle based on the position-force trajectory from a previous engine cycle. In some embodiments, control system 1010 may use a repetitive adaptive control technique that drives force values toward a known and desirable propagation path (e.g., to enforce a smoother or more continuous force profile). For example, control system 1010 may first approximate, based on information from a previous cycle (e.g., force values, engine performance, etc.), a position-force trajectory as a series of discrete force values over an engine cycle. Control system 1010 may then cause the discrete force values to be applied to the piston assembly over each stroke of the engine cycle, and at the end of each cycle, control system 1010 may adjust the discrete force values based on engine operating characteristics, measurements, performance, and/or conditions. Control system 1010 may alter all or some of the discrete force values prior to a subsequent cycle if, for example, a piston assembly does not sufficiently achieve a desired target position for a given stroke. For example, if a piston apexes short of the desired target TDC on a previous cycle, control system 1010 may, on the subsequent cycle, reduce the magnitude of the some or all of the discrete force values. In embodiments with opposed-piston free-piston engines with a shared (or common) combustion section, control system 1010 may alter the discrete force values in one or more portions of a stroke for one or both of the piston assemblies, dependently or independently, during the subsequent cycle. For example, if on a current engine cycle an exhaust piston assembly reached its apex at TDC after the intake piston assembly reached its apex at TDC, control system 1010 can, on the subsequent cycle, adjust the discrete force values applied to the exhaust piston assembly and not adjust the discrete force values applied to the intake piston assembly in order to achieve sufficient synchronization at TDC. This can be achieved by, for example, control system 1010 reducing the magnitude of the discrete force values applied to the exhaust piston assembly over the first half of the stroke, thereby allowing the midpoint velocity of the piston to increase, and then increasing the magnitude of the discrete force values applied to the exhaust piston assembly over the second half of the stroke, thereby achieving sufficient synchronization at TDC. In some embodiments, control system 1010 may use a repetitive adaptive control technique that is based on calculating a deviation from a previously determined trajectory (position-force, position-velocity, time-position, or any suitable trajectory).

Figure 15:
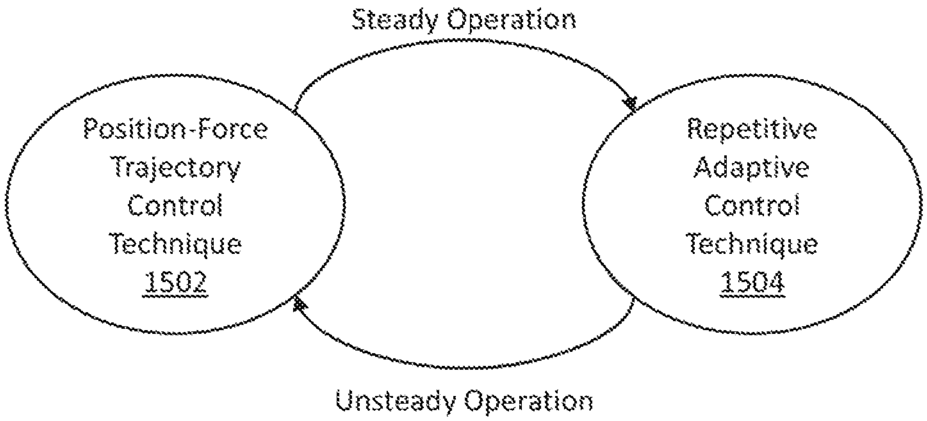
FIG. 15 shows an illustrative state diagram for a hybrid control technique in accordance with some embodiments of the present disclosure.

In some embodiments, control system 1010 may use a hybrid control technique that is capable of switching between multiple control techniques. A hybrid control technique can be advantageous for controlling a free-piston engine across a wide range of operating conditions, controlling a free-piston engine when sufficiently fast and large disturbances in engine operation may occur (e.g., combustion misfire, mechanical failures, gas quality changes, or any other suitable changes), and controlling a free-piston engine under steady or stable operating conditions (e.g., at steady and continuous power output). For example, control system 1010 can employ a position-force trajectory control technique during engine start up and then switch to a repetitive adaptive control technique when the engine operation becomes sufficiently stable or steady. Control system 1010 can then switch back to a position-force trajectory control technique if a sufficiently large disturbance is detected or if a new engine operating condition is desired (e.g., more or less power output, engine shut down). FIG. 15 illustrates one possible implementation of a hybrid control technique. Control system 1010 uses a position-force trajectory control technique at 1502. If control system 1010 determines that conditions become sufficiently steady based on any suitable criteria (e.g., absence of misfires, stable power output, stable efficiencies, thermal equilibrium, or other suitable conditions), control system 1010 switches to a repetitive adaptive control technique at 1504. If control system 1010 determines that operating conditions have or will become sufficiently unsteady based on any suitable criteria, control system 1010 switches back to a position-force trajectory control technique at 1502.

For ease of reference, the figures may show multiple components labeled with identical reference numerals. It will be understood that this does not necessarily indicate that the multiple components identically labeled are identical to one another. For example, the pistons labeled 125 may have different sizes, geometries, materials, any other suitable characteristic, or any combination thereof.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A linear generator system that performs cyclical operations, comprising:
- a piston assembly;
- a cylinder in which the piston assembly translates;
- at least one sensor to output a) data indicative of a position of the piston assembly within the cylinder and b) data indicative of a velocity at which the piston assembly translates in the cylinder; and
- a controller to:
  - determine a position of the piston assembly in the cylinder based on the data indicative of the position,
  - determine a reference position based on a preceding cycle of the linear generator system,
  - determine a velocity of the piston assembly, based on the data indicative of the velocity, associated with a path of the piston assembly as the piston assembly translates between the reference position and the position,
  - determine a kinetic energy of the piston assembly based on the determined velocity, and
  - determine a net electrical energy output of the linear generator system based on the kinetic energy.

2. The linear generator system of claim 1, wherein the reference position is an apex position of the piston assembly.

3. The linear generator system of claim 1, wherein the controller is further configured to:
- determine a target apex;
- determine a force to apply to the piston assembly based on a difference between the target apex and the position; and
- cause the force to be applied to the piston assembly.

4. The linear generator of claim 3, wherein the target apex is determined based on the net electrical energy output.

5. The linear generator system of claim 3, wherein the force to apply is determined based at least in part on a desired engine performance that comprises at least one parameter associated with the target apex.

6. The linear generator system of claim 3, wherein the controller is configured to:
- estimate a current pressure based on a force applied to the piston assembly during the preceding cycle; and
- determine the force to apply based at least in part on the current pressure.

7. The linear generator system of claim 6, wherein the current pressure corresponds to a pressure in a reaction section in contact with the piston assembly.

8. The linear generator system of claim 1, wherein the reference position is determined based on a trajectory from the preceding cycle.

9. The linear generator system of claim 1, wherein:
- the piston assembly cycles between apices defining two strokes; and
- the linear generator system produces the net electrical energy output over both of the two strokes.

10. The linear generator system of claim 1, wherein:
- the piston assembly is a first piston assembly;
- the linear generator system further comprises a second piston assembly; and
- the controller is configured to effect displacement of the first piston assembly and the second piston assembly by synchronizing apices of the first piston assembly with apices of the second piston assembly.

11. A method of monitoring a linear generator system that performs cyclical operations, the method comprising:
- determining a position of a piston assembly of the linear generator system in a cylinder of the linear generator system based on sensor data indicative of the position;
- determining a reference position based on a preceding cycle of the linear generator system;
- determining a velocity of the piston assembly, based on sensor data indicative of the velocity, associated with a path of the piston assembly as the piston assembly translates between the reference position and the position;
- determining a kinetic energy of the piston assembly based on the determined velocity, and
- determining a net electrical energy output of the linear generator system based on the kinetic energy.

12. The method of claim 11, wherein the reference position is an apex position of the piston assembly within the cylinder.

13. The method of claim 11, further comprising:
- determining a target apex;
- determining a force to apply to the piston assembly based on a difference between the target apex and the position; and
- causing the force to be applied to the piston assembly.

14. The method of claim 13, further comprising determining the target position based on the net electrical energy output.

15. The method of claim 13, further comprising determining the force to apply based at least in part on a desired engine performance that comprises at least one parameter associated with the target apex.

16. The method of claim 13, further comprising:
- estimating a current pressure based on a force applied to the piston assembly during the preceding cycle; and
- determining the force to apply based at least in part on the current pressure.

17. The method of claim 16, wherein the current pressure corresponds to a pressure in a reaction section in contact with the piston assembly.

18. The method of claim 11, further comprising determining the reference position based on a trajectory from the preceding cycle.

19. The method of claim 11, further comprising producing the net electrical energy output over two strokes, wherein the piston assembly cycles between apices of the two strokes.

20. The method of claim 11, further comprising synchronizing apices of the piston assembly by effecting displacement of the piston assembly based on the net electrical output.

* * * * *